(12) United States Patent
Sathaye et al.

(10) Patent No.: US 12,437,856 B2
(45) Date of Patent: Oct. 7, 2025

(54) MACHINE LEARNING TECHNIQUES FOR PARASOMNIA EPISODE MANAGEMENT

(71) Applicant: UnitedHealth Group Incorporated, Minnetonka, MN (US)

(72) Inventors: Ninad D. Sathaye, Bangalore (IN); Damian Kelly, Kildare (IE); Kimberly A. Vorse, Ketchum, ID (US); Atul Kumar, Bangalore (IN); Rahul Dutta, Bengaluru (IN); Love Hasija, Sonepat (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 928 days.

(21) Appl. No.: 17/583,899

(22) Filed: Jan. 25, 2022

(65) Prior Publication Data
US 2023/0238112 A1    Jul. 27, 2023

(51) Int. Cl.
*G16H 20/70* (2018.01)
*A61B 5/00* (2006.01)
*G16H 50/20* (2018.01)

(52) U.S. Cl.
CPC .......... *G16H 20/70* (2018.01); *A61B 5/0006* (2013.01); *A61B 5/4812* (2013.01); *G16H 50/20* (2018.01)

(58) Field of Classification Search
CPC ...... G16H 20/70; G16H 50/20; A61B 5/0006; A61B 5/4812
See application file for complete search history.

(56) References Cited

U.S. PATENT DOCUMENTS

| | | | |
|---|---|---|---|
| 5,999,846 A | 12/1999 | Pardey et al. | |
| 7,509,163 B1 * | 3/2009 | Luo | A61B 5/369 600/544 |
| 7,942,824 B1 | 5/2011 | Kayyali et al. | |
| 8,903,494 B2 | 12/2014 | Goldwasser et al. | |
| 10,188,342 B2 | 1/2019 | Boyle et al. | |

(Continued)

OTHER PUBLICATIONS

Non-Final Rejection Mailed on Jun. 4, 2024 for U.S. Appl. No. 17/583,921, 23 page(s).

(Continued)

*Primary Examiner* — David E Choi
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations for parasomnia episode management. For example, certain embodiments of the present invention utilize systems, methods, and computer program products that perform predictive data analysis operations for parasomnia episode management using at least one of pre-sleep parasomnia episode likelihood prediction machine learning models, in-sleep parasomnia episode likelihood prediction machine learning models, augmented parasomnia episode likelihood prediction machine learning models that are configured to generate conditional likelihood scores for candidate parasomnia reduction interventions, deep reinforcement learning machine learning models that are configured to generate recommended parasomnia reduction interventions, and dynamically-deployable parasomnia episode likelihood prediction machine learning models.

20 Claims, 9 Drawing Sheets

(56) References Cited

U.S. PATENT DOCUMENTS

| | | |
|---|---|---|
| 10,402,721 B2 | 9/2019 | Corrado et al. |
| 12,165,017 B1 | 12/2024 | Grossman |
| 2016/0005320 A1 | 1/2016 | deCharms et al. |
| 2016/0022168 A1 | 1/2016 | Luczak et al. |
| 2017/0055898 A1 | 3/2017 | Bandyopadhyay et al. |
| 2018/0085549 A1 | 3/2018 | Kaislasaari |
| 2019/0008577 A1 | 1/2019 | Lazarus et al. |
| 2019/0134396 A1 | 5/2019 | Toth et al. |
| 2020/0388287 A1* | 12/2020 | Anushiravani ........ G16H 20/10 |
| 2021/0169417 A1* | 6/2021 | Burton ................ A61B 5/4857 |
| 2021/0287792 A1 | 9/2021 | Fan |
| 2021/0327584 A1* | 10/2021 | Vakulin ................ A61B 5/021 |
| 2022/0015695 A1* | 1/2022 | Margarito ............ A61B 5/4809 |
| 2022/0108125 A1 | 4/2022 | Dai et al. |
| 2022/0133156 A1 | 5/2022 | Hartley et al. |
| 2022/0218293 A1* | 7/2022 | Chou ................... A61B 7/003 |
| 2022/0233805 A1* | 7/2022 | Lee ...................... G16H 20/70 |
| 2023/0097897 A1 | 3/2023 | Campos et al. |
| 2023/0113752 A1 | 4/2023 | Jorlett et al. |
| 2023/0169587 A1 | 6/2023 | Gao |
| 2023/0233793 A1 | 7/2023 | Sathaye et al. |
| 2023/0238113 A1 | 7/2023 | Sathaye et al. |
| 2024/0046461 A1* | 2/2024 | Gill ..................... G06T 7/0012 |
| 2024/0252107 A1* | 8/2024 | Lee ..................... A61B 5/7203 |

OTHER PUBLICATIONS

Abbate, Stefano et al. "MIMS: A Minimally Invasive Monitoring Sensor Platform," IEEE Sensors Journal, May 2, 2011, vol. 12, No. 3, pp. 677-684.

Boe, Alexander J. et al. "Automating Sleep Stage Classification Using Wireless, Wearable Sensors," Nature Partner Journals npj|Digital Medicine, vol. 2, No. 131, Dec. 20, 2019, pp. 1-9.

Pulantara, I. Wayan et al. "Clinical Feasibility of a Just-In-Time Adaptive Intervention App (iREST) as a Behavioral Sleep Treatment in a Military Population: Feasibility Comparative Effectiveness Study," Journal of Medical Internet Research, vol. 20, No. 12:e10124, (Year: 2018), pp. 1-15, DOI: 10.2196/10124.

Zak, Rochelle et al. "Nightmares and Nightmare Disorder in Adults," UpToDate, Jun. 22, 2020, (25 pages), [Retrieved from the Internet Apr. 11, 2022] <URL: https://www.uptodate.com/contents/nightmares-and-nightmare-disorder-in-adults>.

Advisory Action (PTOL-303) Mailed on Jan. 3, 2025 for U.S. Appl. No. 17/583,921, 8 page(s).

Final Rejection Mailed on Oct. 25, 2024 for U.S. Appl. No. 17/583,921, 27 page(s).

Non-Final Rejection Mailed on Apr. 3, 2025 for U.S. Appl. No. 17/648,879, 8 page(s).

Non-Final Rejection Mailed on Mar. 6, 2025 for U.S. Appl. No. 17/583,921, 9 page(s).

\* cited by examiner

MACHINE LEARNING TECHNIQUES FOR PARASOMNIA EPISODE MANAGEMENT

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations for parasomnia episode management. For example, certain embodiments of the present invention utilize systems, methods, and computer program products that perform predictive data analysis operations for parasomnia episode management using at least one of pre-sleep parasomnia episode likelihood prediction machine learning models, in-sleep parasomnia episode likelihood prediction machine learning models, augmented parasomnia episode likelihood prediction machine learning models that are configured to generate conditional likelihood scores for candidate parasomnia reduction interventions, deep reinforcement learning machine learning models that are configured to generate recommended parasomnia reduction interventions, and dynamically-deployable parasomnia episode likelihood prediction machine learning models.

In accordance with an aspect, a method is provided. In one embodiment, the method comprises: determining, based at least in part on an electrocardiogram sequence, a wave feature sequence, a heart rate feature sequence, and a pulse feature sequence; determining, using a wave feature processing recurrent neural network machine learning model and based at least in part on the wave feature sequence, a wave-based representation of the electrocardiogram sequence; determining, using a heart rate feature processing recurrent neural network machine learning model and based at least in part on the heart rate feature sequence, a heart-rate-based representation of the electrocardiogram sequence; determining, using a pulse feature processing recurrent neural network machine learning model and based at least in part on the pulse feature sequence, a pulse-based representation of the electrocardiogram sequence; determining, based at least in part on the wave-based engineered feature, the heart-rate-based feature, the pulse-based feature, and an electrocardiogram frequency domain representation of the electrocardiogram sequence, a model input for a parasomnia episode likelihood prediction machine learning model; determining, using the parasomnia episode likelihood prediction machine learning model based at least in part on the model input, the parasomnia episode likelihood prediction score; and performing one or more prediction-based actions based at least in part on the parasomnia episode likelihood prediction score.

In accordance with another aspect, a computer program product is provided. The computer program product may comprise at least one computer-readable storage medium having computer-readable program code portions stored therein, the computer-readable program code portions comprising executable portions configured to: determine, based at least in part on an electrocardiogram sequence, a wave feature sequence, a heart rate feature sequence, and a pulse feature sequence; determining, using a wave feature processing recurrent neural network machine learning model and based at least in part on the wave feature sequence, a wave-based representation of the electrocardiogram sequence; determine, using a heart rate feature processing recurrent neural network machine learning model and based at least in part on the heart rate feature sequence, a heart-rate-based representation of the electrocardiogram sequence; determine, using a pulse feature processing recurrent neural network machine learning model and based at least in part on the pulse feature sequence, a pulse-based representation of the electrocardiogram sequence; determine, based at least in part on the wave-based engineered feature, the heart-rate-based feature, the pulse-based feature, and an electrocardiogram frequency domain representation of the electrocardiogram sequence, a model input for a parasomnia episode likelihood prediction machine learning model; determine, using the parasomnia episode likelihood prediction machine learning model based at least in part on the model input, the parasomnia episode likelihood prediction score; and perform one or more prediction-based actions based at least in part on the parasomnia episode likelihood prediction score.

In accordance with yet another aspect, an apparatus comprising at least one processor and at least one memory including computer program code is provided. In one embodiment, the at least one memory and the computer program code may be configured to, with the processor, cause the apparatus to: determine, based at least in part on an electrocardiogram sequence, a wave feature sequence, a heart rate feature sequence, and a pulse feature sequence; determining, using a wave feature processing recurrent neural network machine learning model and based at least in part on the wave feature sequence, a wave-based representation of the electrocardiogram sequence; determine, using a heart rate feature processing recurrent neural network machine learning model and based at least in part on the heart rate feature sequence, a heart-rate-based representation of the electrocardiogram sequence; determine, using a pulse feature processing recurrent neural network machine learning model and based at least in part on the pulse feature sequence, a pulse-based representation of the electrocardiogram sequence; determine, based at least in part on the wave-based engineered feature, the heart-rate-based feature, the pulse-based feature, and an electrocardiogram frequency domain representation of the electrocardiogram sequence, a model input for a parasomnia episode likelihood prediction machine learning model; determine, using the parasomnia episode likelihood prediction machine learning model based at least in part on the model input, the parasomnia episode likelihood prediction score; and perform one or more prediction-based actions based at least in part on the parasomnia episode likelihood prediction score.

In accordance with another aspect, a method is provided. In one embodiment, the method comprises: determining, using a deep reinforcement machine learning model, and based at least in part on an ongoing sleep window representation of an ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention; determining a recommended parasomnia reduction intervention based at least in part on the plurality of operational parameter values of the recommended intervention vector; and performing one or more prediction-based actions based at least in part on the recommended parasomnia reduction intervention.

In accordance with another aspect, a computer program product is provided. The computer program product may comprise at least one computer-readable storage medium having computer-readable program code portions stored therein, the computer-readable program code portions comprising executable portions configured to: determine, using a deep reinforcement machine learning model, and based at least in part on an ongoing sleep window representation of an ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention; determine a recommended parasomnia reduction intervention based at least in part on the plurality of operational parameter values of the recommended intervention vector; and perform one or more prediction-based actions based at least in part on the recommended parasomnia reduction intervention.

In accordance with yet another aspect, an apparatus comprising at least one processor and at least one memory including computer program code is provided. In one embodiment, the at least one memory and the computer program code may be configured to, with the processor, cause the apparatus to: determine, using a deep reinforcement machine learning model, and based at least in part on an ongoing sleep window representation of an ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention; determine a recommended parasomnia reduction intervention based at least in part on the plurality of operational parameter values of the recommended intervention vector; and perform one or more prediction-based actions based at least in part on the recommended parasomnia reduction intervention.

In accordance with another aspect, a method is provided. In one embodiment, the method comprises: determining a deployment indicator for a dynamically-deployed parasomnia episode likelihood prediction machine learning model, wherein: (i) the deployment indicator is determined based at least in part on whether the dynamically-deployed parasomnia episode likelihood prediction machine learning model is deployed, (ii) the dynamically-deployed parasomnia episode likelihood prediction machine learning model is deployed when one or more dynamic deployment conditions are satisfied, (iii) the one or more dynamic deployment conditions comprise a first condition requiring that a training data entry count of a training data entry set satisfies a training data entry count threshold, (iv) the parasomnia episode likelihood prediction machine learning model is generated based at least in part on the training data entry set, and (v) each training data entry in the training data entry set is associated with a training model input and a target model output; and in response to determining that the deployment indicator is a negative deployment indicator: (i) determining, based at least in part on one or more statically-deployed feature values and using a preexisting parasomnia episode likelihood prediction machine learning model, a parasomnia episode likelihood score, (ii) generating, based at least in part on the one or more statically-deployed feature values and the one or more dynamically-deployed feature values, the training model input for a new training entry in the training data entry set, (iii) determining, based at least in part on an end user feedback data object for the ongoing sleep window, the target model output for the new training entry, and (iv) incrementing the training data entry count; and performing one or more prediction-based actions based at least in part on the parasomnia episode likelihood score.

In accordance with another aspect, a computer program product is provided. The computer program product may comprise at least one computer-readable storage medium having computer-readable program code portions stored therein, the computer-readable program code portions comprising executable portions configured to: determine a deployment indicator for a dynamically-deployed parasomnia episode likelihood prediction machine learning model, wherein: (i) the deployment indicator is determined based at least in part on whether the dynamically-deployed parasomnia episode likelihood prediction machine learning model is deployed, (ii) the dynamically-deployed parasomnia episode likelihood prediction machine learning model is deployed when one or more dynamic deployment conditions are satisfied, (iii) the one or more dynamic deployment conditions comprise a first condition requiring that a training data entry count of a training data entry set satisfies a training data entry count threshold, (iv) the parasomnia episode likelihood prediction machine learning model is generated based at least in part on the training data entry set, and (v) each training data entry in the training data entry set is associated with a training model input and a target model output; and in response to determining that the deployment indicator is a negative deployment indicator: (i) determine, based at least in part on one or more statically-deployed feature values and using a preexisting parasomnia episode likelihood prediction machine learning model, a parasomnia episode likelihood score, (ii) generate, based at least in part on the one or more statically-deployed feature values and the one or more dynamically-deployed feature values, the training model input for a new training entry in the training data entry set, (iii) determine, based at least in part on an end user feedback data object for the ongoing sleep window, the target model output for the new training entry, and (iv) increment the training data entry count; and perform one or more prediction-based actions based at least in part on the parasomnia episode likelihood score.

In accordance with yet another aspect, an apparatus comprising at least one processor and at least one memory including computer program code is provided. In one embodiment, the at least one memory and the computer program code may be configured to, with the processor, cause the apparatus to: determine a deployment indicator for a dynamically-deployed parasomnia episode likelihood prediction machine learning model, wherein: (i) the deployment indicator is determined based at least in part on whether the dynamically-deployed parasomnia episode likelihood prediction machine learning model is deployed, (ii) the dynamically-deployed parasomnia episode likelihood prediction machine learning model is deployed when one or more dynamic deployment conditions are satisfied, (iii) the one or more dynamic deployment conditions comprise a first condition requiring that a training data entry count of a training data entry set satisfies a training data entry count threshold, (iv) the parasomnia episode likelihood prediction machine learning model is generated based at least in part on the training data entry set, and (v) each training data entry in the training data entry set is associated with a training model input and a target model output; and in response to determining that the deployment indicator is a negative deployment indicator: (i) determine, based at least in part on one or more statically-deployed feature values and using a preexisting parasomnia episode likelihood prediction machine learning model, a parasomnia episode likelihood score, (ii) generate, based at least in part on the one or more statically-deployed feature values and the one or more dynamically-deployed feature values, the training model input for a new training entry in the training data entry set, (iii) determine, based at least in part on an end user feedback data object for the ongoing sleep window, the target model output for the new training entry, and (iv) increment the training data entry count; and perform one or more prediction-based actions based at least in part on the parasomnia episode likelihood score.

BRIEF DESCRIPTION OF THE DRAWINGS

Figure 1:
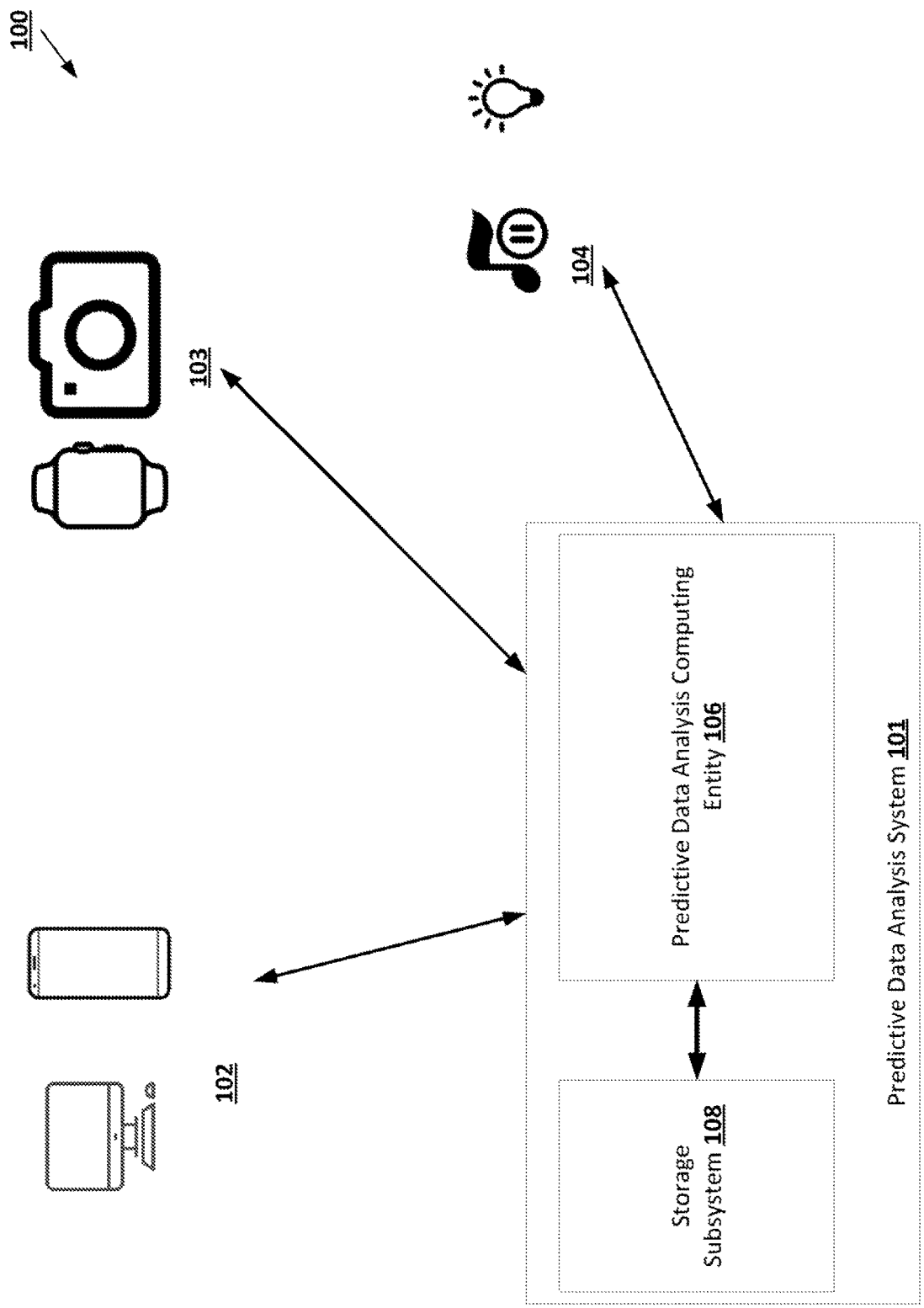

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
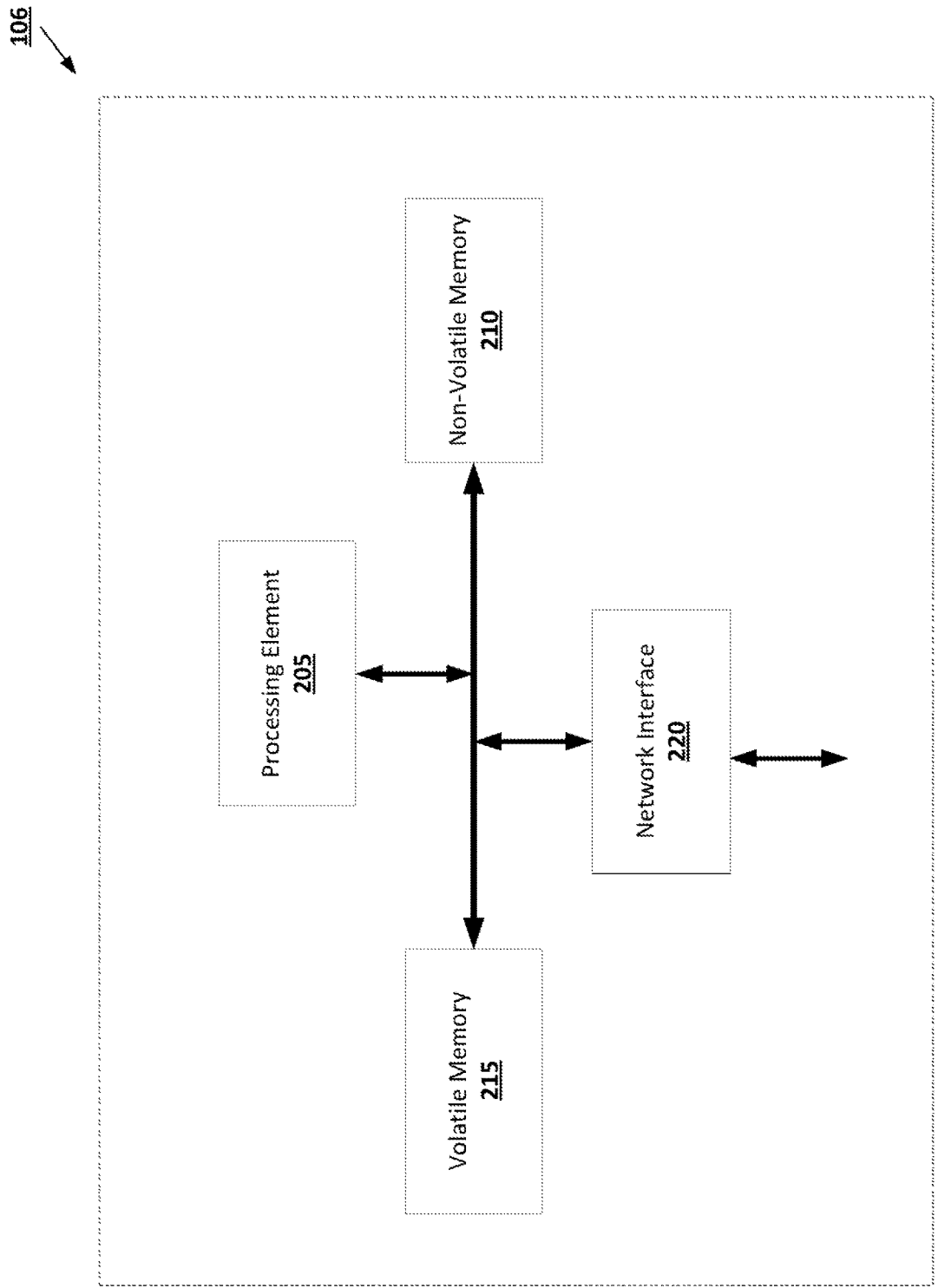

FIG. 2 provides an example predictive data analysis computing entity in accordance with some embodiments discussed herein.

Figure 3:
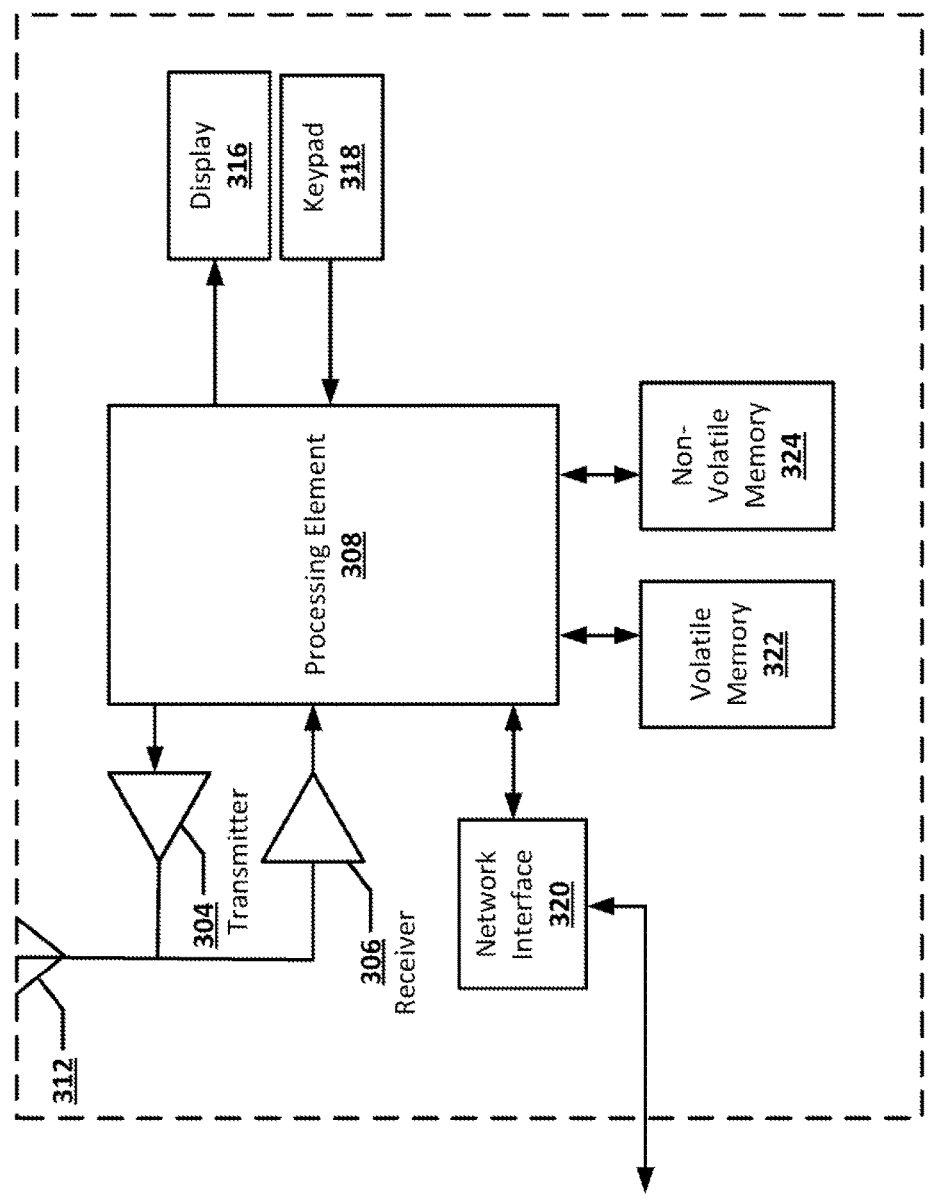

FIG. 3 provides an example client computing entity in accordance with some embodiments discussed herein.

Figure 4:
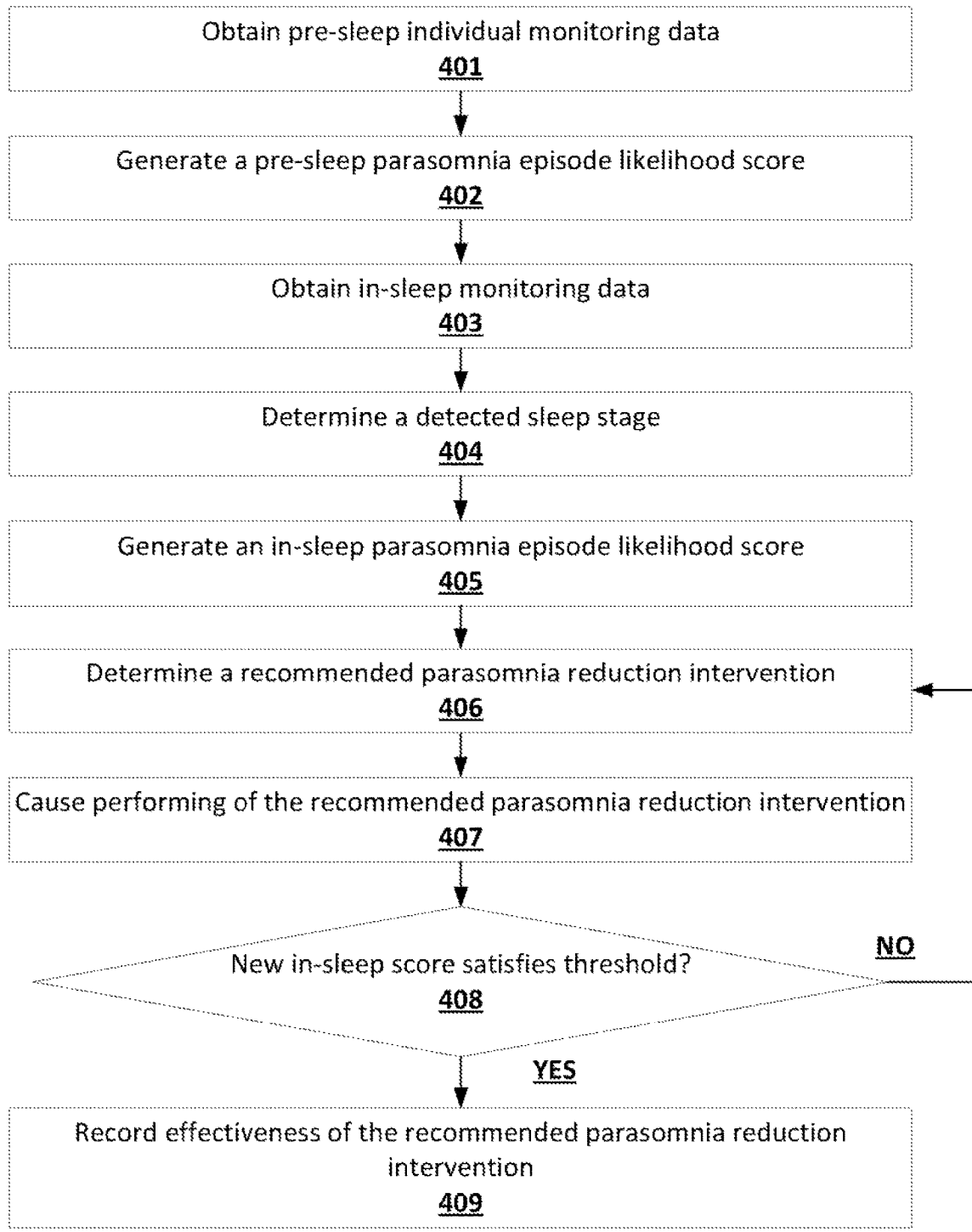

FIG. 4 is a flowchart diagram of an example process for performing parasomnia-related predictive data analysis for a monitored individual in accordance with some embodiments discussed herein.

Figure 5:
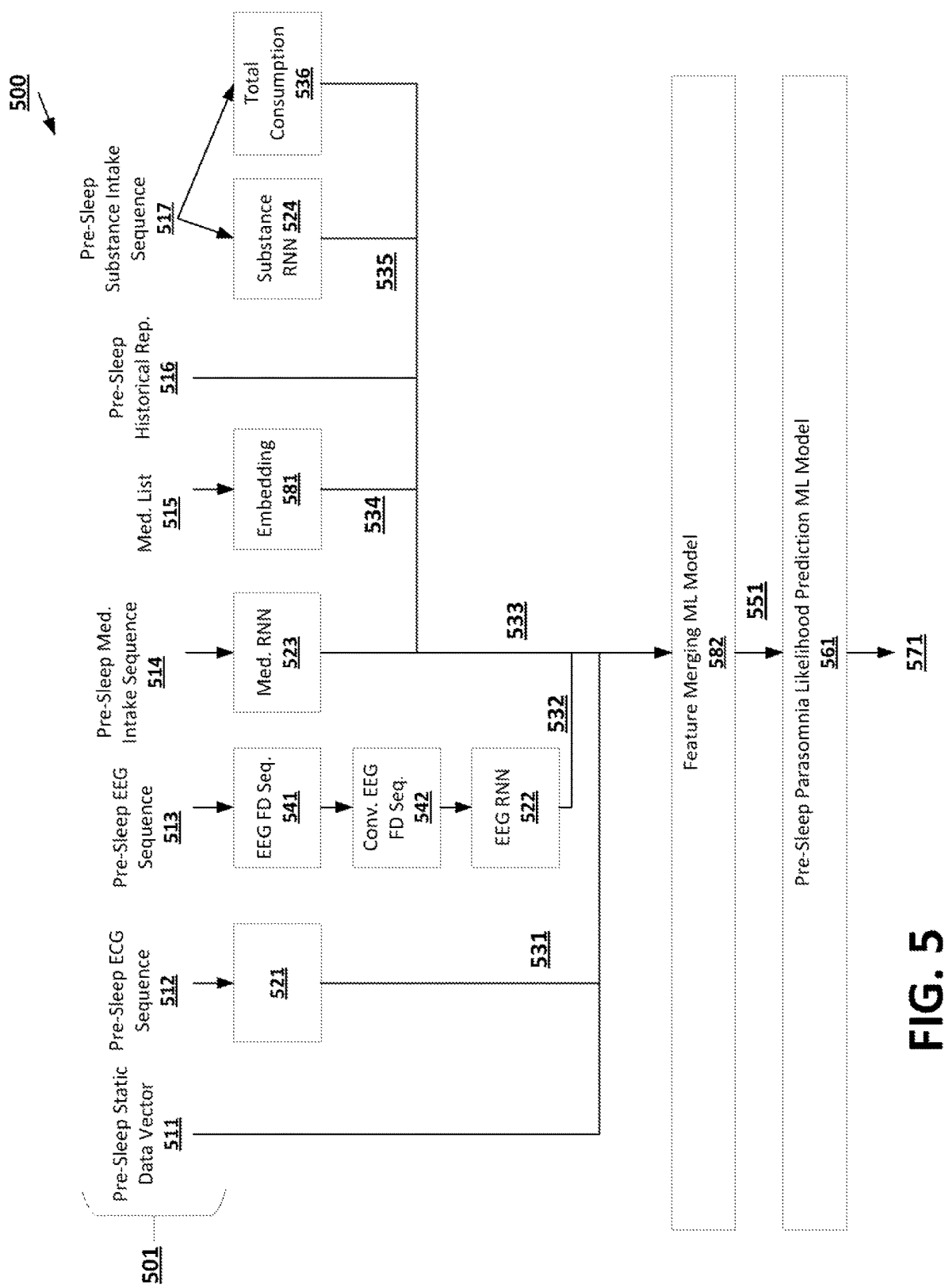

FIG. 5 is a data diagram of an example process for generating a pre-sleep parasomnia likelihood score in accordance with some embodiments discussed herein.

Figure 6:
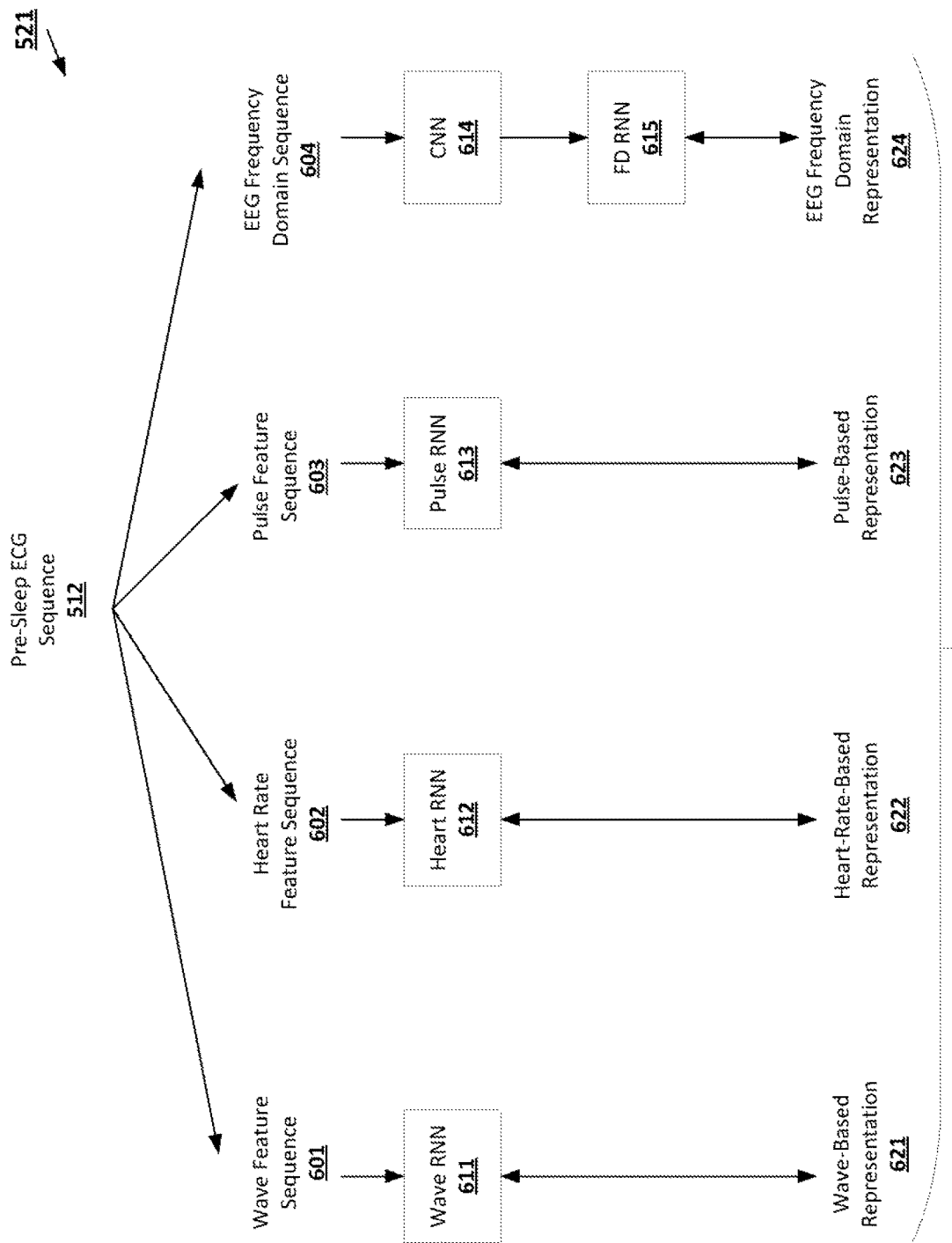

FIG. 6 provides an operational example of a pre-sleep ECG sequence processing machine learning framework in accordance with some embodiments discussed herein.

Figure 7:
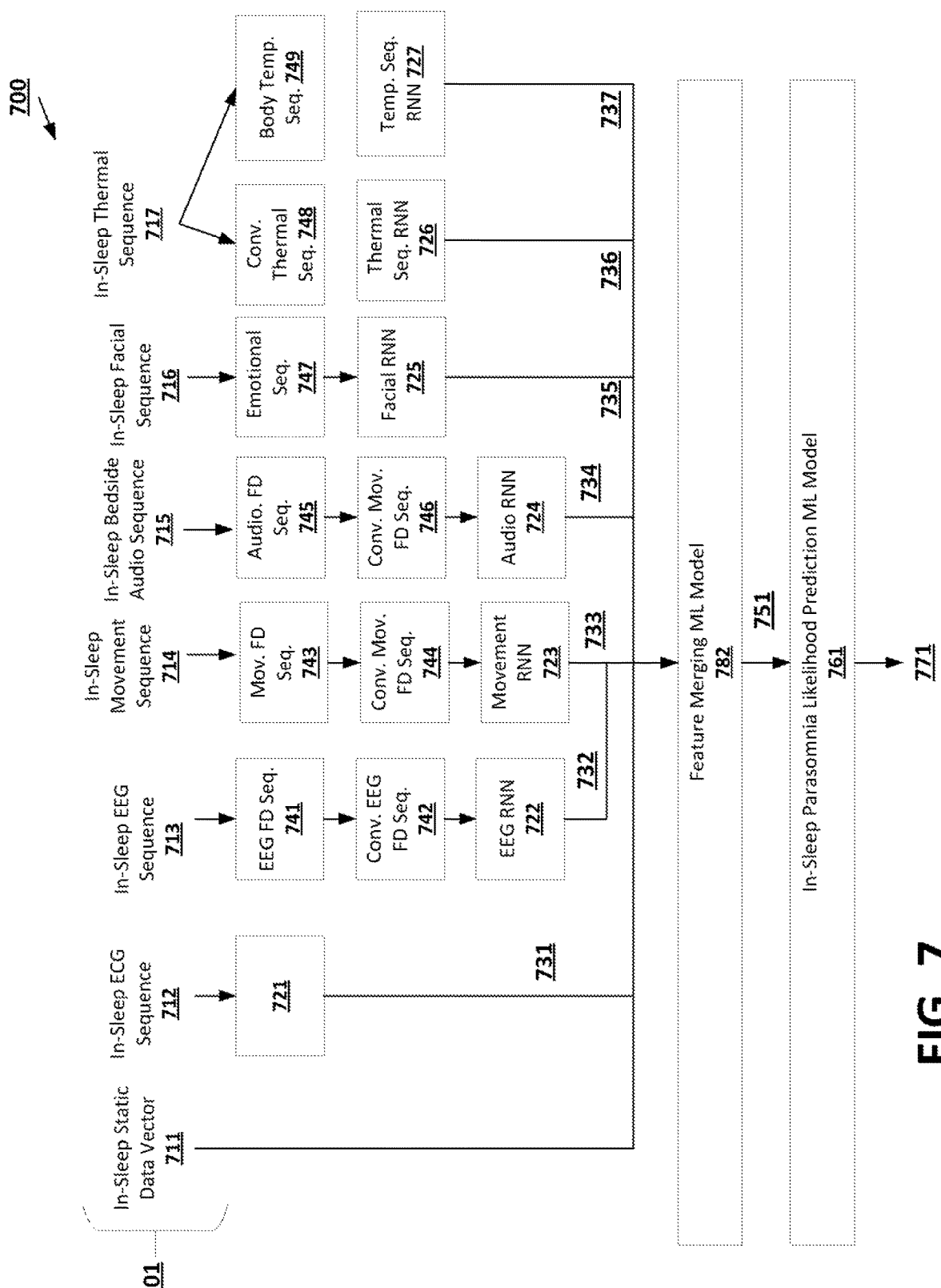

FIG. 7 is a data diagram of an example process for generating an in-sleep parasomnia likelihood score in accordance with some embodiments discussed herein.

Figure 8:
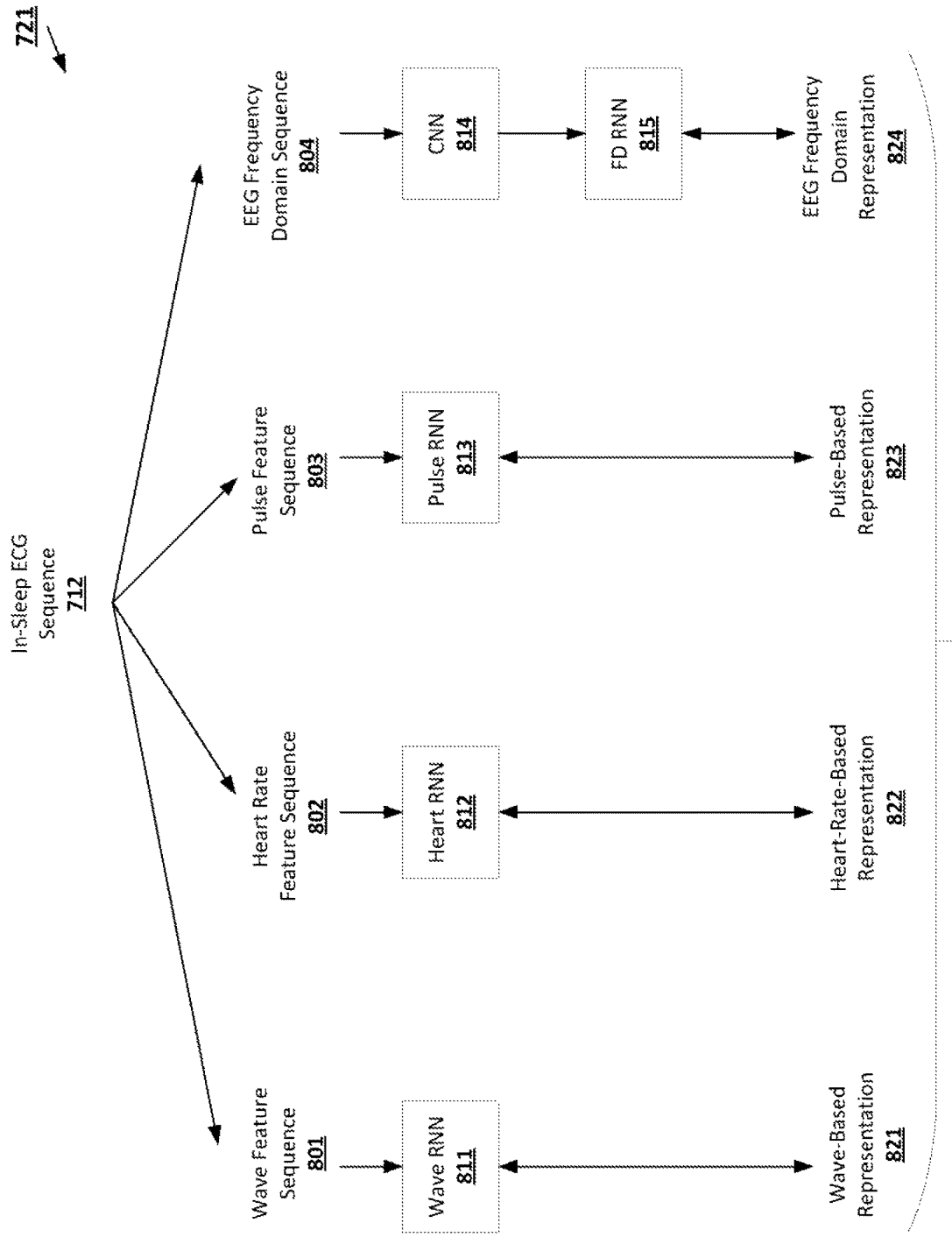

FIG. 8 provides an operational example of an in-sleep ECG sequence processing machine learning framework in accordance with some embodiments discussed herein.

Figure 9:
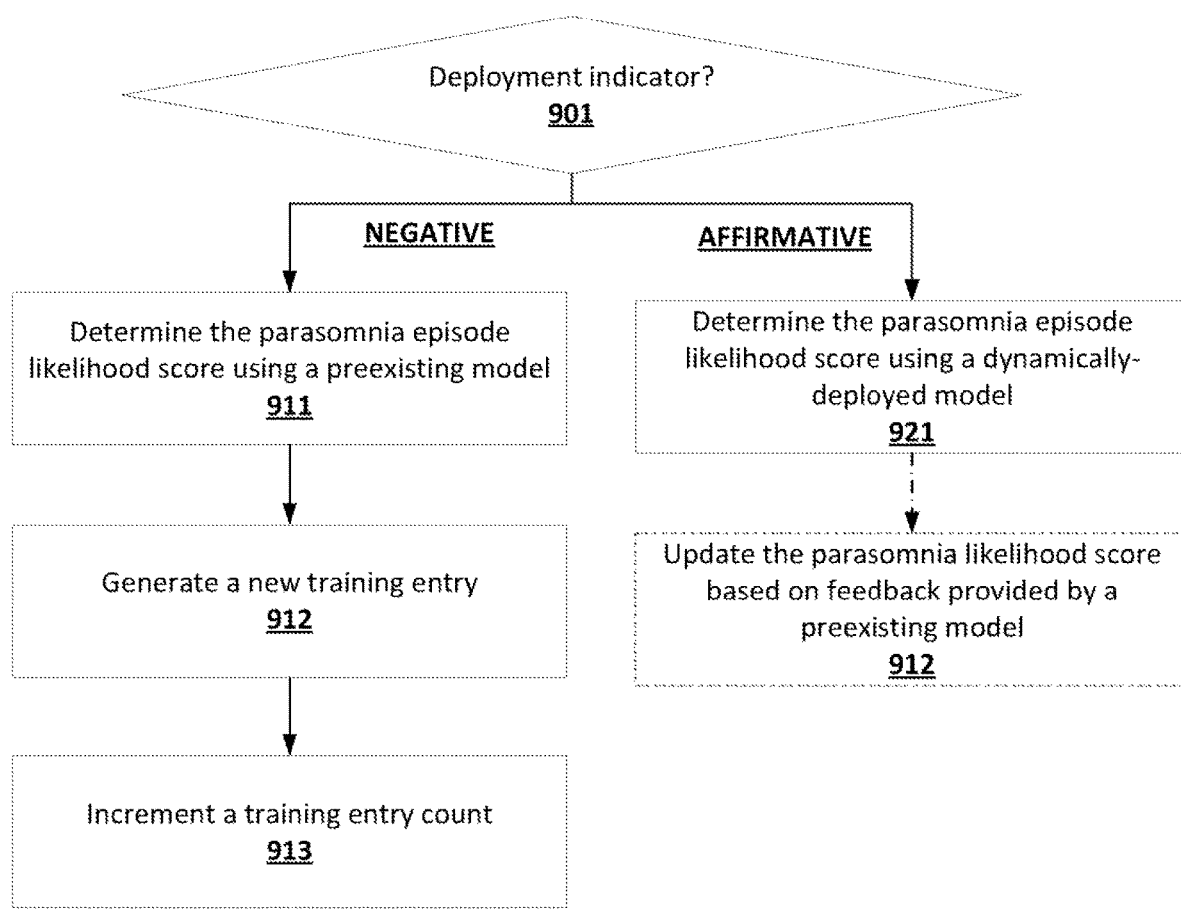

FIG. 9 is a flowchart diagram of an example process for generating a parasomnia episode likelihood score for an ongoing sleep window that is associated with one or more statically-deployed feature values and one or more dynamically-deployed feature values in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention improve real-time efficiency of performing parasomnia-related predictive data analysis for a monitored individual by introducing techniques that enable integrating pre-sleep predictive inferences into in-sleep predictive inferences in order to generate in-sleep predictive inferences faster. For example, in some embodiments, both pre-sleep models and in-sleep models are configured to process data having common feature types, such as an ECG feature sequence, an EGG feature sequence, and/or the like. By using this technique, various embodiments of the present invention impose a conceptual relationship between the predictive inferences performed by pre-sleep models and predictive inferences performed by in-sleep models, which in turn makes pre-sleep predictive inferences more pertinent to in-sleep predictive inferences and thus enables making in-sleep models more efficient and faster by integrating pre-sleep predictive inferences into such models. This is critical for operational reliability of real-time parasomnia detection/intervention models, as due to health reasons time is of the essence when it comes to harm reduction objectives of such models. Accordingly, various embodiments of the present invention make important technical contributions to improving real-time efficiency of performing parasomnia-related predictive data analysis for a monitored individual by introducing techniques that facilitate effective integration of pre-sleep feedback into in-sleep predictive inferences of parasomnia detection/intervention models.

Various embodiments of the present invention introduce techniques for efficient parasomnia reduction intervention in real-time by introducing techniques that enable utilizing efficient deep reinforcement learning models in detecting optimal parasomnia reduction interventions. For example, in some embodiments, to select the recommended in-sleep parasomnia reduction intervention from the set of candidate in-sleep parasomnia reduction interventions for an ongoing sleep window, an ongoing sleep time representation of the ongoing sleep window (e.g., an ongoing sleep time representation that is determined based at least in part on a model input of an in-sleep parasomnia episode likelihood prediction machine learning model for the ongoing sleep window) is used to generate an existing state of the environment that may then be supplied to a deep reinforcement learning machine learning model, where the deep reinforcement learning machine learning model may be configured to select the recommended in-sleep parasomnia reduction intervention in a manner that is configured to maximize a value generation sub-model (e.g., a Q function) of the deep reinforcement machine learning model given the existing state defined by the ongoing sleep time representation. By using the noted techniques, various embodiments of the present invention enable efficient and reliable detection of optimal parasomnia reduction interventions in real-time, thus making important technical contributions to improving real-time efficiency of performing parasomnia-related predictive data analysis for a monitored individual.

Various embodiments of the present invention enable techniques for improving real-time efficiency of performing parasomnia-related predictive data analysis for a monitored individual by introducing techniques that enable dynamic deployment of a parasomnia episode likelihood prediction machine learning model whose expected input is associated with both statically-deployed features and dynamically-deployed features. In some embodiments, because the model input of a parasomnia episode likelihood prediction machine learning model is associated with statically-deployed features and dynamically-deployed features, a trained parasomnia episode likelihood prediction machine learning model that is trained in one physical environment cannot reliably be deployed in a second physical environment, as the predictive model developed through the training process with respect to the dynamically-deployed feature values may be physical-environment-specific. Accordingly, in some embodiments, a parasomnia episode likelihood prediction machine learning model is dynamically deployed in a new physical environment in the following manner: before sufficient training data entries for the new physical environment is obtained, parasomnia episode likelihood scores for particular time windows (e.g., particular pre-sleep windows, particular ongoing sleep windows, and/or the like) are generated using a preexisting parasomnia episode likelihood prediction machine learning model whose model input is not characterized by the dynamically-deployed features, but user feedback for the particular time windows is used to aggregate training data entries that are then used to train and deploy the parasomnia episode likelihood prediction machine learning model when sufficient training data entries are obtained/recorded for training the parasomnia episode likelihood prediction machine learning model. By using the noted techniques, various embodiments of the present invention ensure that a parasomnia episode likelihood prediction machine learning model whose expected input is associated with both statically-deployed features and dynamically-deployed features is only deployed when sufficiently trained, thus avoiding the accuracy and efficiency drawbacks of deploying insufficiently trained parasomnia episode likelihood prediction machine learning models and in doing so improving real-time efficiency of performing parasomnia-related predictive data analysis for a monitored individual.

II. Definitions

The term "parasomnia episode" may describe an instance of occurrence of a sleep disorder that involves undesirable physical events or experiences that disrupt sleep. People suffering from parasomnia may suffer from repeated occurrences of extended, extremely dysphoric, and well-remembered dreams that usually involve efforts to avoid threats to survival, security, or physical integrity, and that generally occur during the second half of the major sleep episode. Parasomnia episodes often strong psychological, physical, or pharmacological stress and can exacerbate primary stress through nightmares. Rapid Eye Movement (REM) sleep is critically important to people suffering from parasomnia, especially to people suffering Chronic Nightmare Disorder.

The term "pre-sleep window" may refer to a data construct that describes a defined-length period of time prior to an expected/scheduled/detected sleep window of the monitored individual, such as a 12 hour period of time prior to an expected/scheduled/detected sleep window of a monitored individual. In some embodiments, a pre-sleep window is associated with pre-sleep individual monitoring data. Examples of pre-sleep individual monitoring data comprise at least one of an electrocardiogram (ECG) sequence for a pre-sleep window, an electroencephalogram (EEG) sequence for a pre-sleep window, a medication intake sequence for a pre-sleep window, a prescribed medication list for a pre-sleep window, a historical representation of a pre-sleep window that describes feature data associated with a preceding time window for the pre-sleep window, and a target substance intake sequence for a pre-sleep window.

The term "ongoing sleep window" may refer to a data construct that is configured to describe a defined-length period of time during an expected/scheduled/detected sleep window of a monitored individual, such as 10 minute period of time during an expected/scheduled/detected sleep window of the monitored individual. In some embodiments, an ongoing sleep window is associated with in-sleep individual monitoring data. Examples of in-sleep individual monitoring data comprise at least one of ECG data for blood alcohol level measurements for an ongoing sleep window (e.g., as determined based at least in part on output data of an epidermal patch and/or wrist band sensor device), noradrenaline hormone level measurements for an ongoing sleep window (e.g., as determined based at least in part on output data of an epidermal patch sensor device), norepinephrine hormone level measurements for an ongoing sleep window (e.g., as determined based at least in part on output data of an epidermal patch sensor device), ECG/pulse measurements for an ongoing sleep window (e.g., as determined based at least in part on output data of EEG sensor device, such as an EEG sensor device connected to a wrist band of the monitored individual), EEG measurements for an ongoing sleep window (e.g., as determined based at least in part on output data of an EEG sensor device, such as an EEG sensor device connected to a head band of the monitored individual), electrooculogram (EOG) measurements for an ongoing sleep window (e.g., as determined based at least in part on output data of an EOG sensor device, such as an EOG sensor device connected to a face of the monitored individual), electromyogram (EMG) measurements for an ongoing sleep window (e.g., as determined based at least in part on output data of an EMG sensor device, such as an EMG sensor device connected to a face of the monitored individual), blood oxygen levels for an ongoing sleep window (as determined based at least in part on output data of a sensor device, such as a sensor device connected to a wrist band of the monitored individual), skin conductance response measurements for an ongoing sleep window (e.g., as determined based at least in part on output data of an epidermal patch sensor device), facial expression data for an ongoing sleep window (e.g., as determined based at least in part on output of an infrared camera), audio data for an ongoing sleep window (e.g., as determined based at least in part on output of a microphone recorder), ambient light data of a sleeping room for an ongoing sleep window, ambient temperature data of a sleeping room of an ongoing sleep window (e.g., as determined based at least in part on an air-conditioning system interface of an air-conditioning system of the sleeping room), smart speaker command data for an ongoing sleep window, and/or the like.

The term "parasomnia episode likelihood prediction machine learning model" may refer to a data construct that describes parameters, hyper-parameters, and/or defined operations of a machine learning model that is configured to process a time window representation of a monitored time window (e.g., a pre-sleep window representation of a pre-sleep window, an ongoing sleep window representation of an ongoing sleep window, and/or the like) to generate an parasomnia episode likelihood score for the monitored time window (e.g., a pre-sleep parasomnia episode likelihood score for a pre-sleep window, an in-sleep sleep parasomnia episode likelihood score for an ongoing sleep window, and/or the like). Examples of parasomnia episode likelihood prediction machine learning models include pre-sleep parasomnia episode likelihood prediction machine learning models and in-sleep parasomnia episode likelihood prediction machine learning models.

The term "pre-sleep parasomnia episode likelihood prediction machine learning model" may refer to a data construct that describes parameters, hyper-parameters, and/or defined operations of a machine learning model that is configured to process a pre-sleep model input that is generated based at least in part on the pre-sleep individual monitoring data for a pre-sleep window in order to generate a pre-sleep parasomnia episode likelihood score that describes a predicted likelihood that a sleep window following the pre-sleep window causes occurrence of one or more parasomnia episodes. The pre-sleep parasomnia episode likelihood prediction machine learning model may comprise a dense neural network and/or a fully-connected neural network. The output of the pre-sleep parasomnia episode likelihood prediction machine learning model may comprise a vector, where a first value of the vector describes a likelihood that the monitored individual will suffer from a parasomnia episode during an upcoming sleep window and a second value of the vector describes a likelihood that the monitored individual will not suffer from a parasomnia episode during an upcoming sleep window. The output of the pre-sleep parasomnia episode likelihood prediction machine learning model may comprise an atomic value that describes a likelihood that the monitored individual will suffer from a parasomnia episode during an upcoming sleep window and/or a likelihood that the monitored individual will not suffer from a parasomnia episode during an upcoming sleep window. The output of the pre-sleep parasomnia episode likelihood prediction machine learning model may comprise a vector, where each value of the vector describes the likelihood that the monitored individual will suffer from a parasomnia episode having a parasomnia episode type that is associated with the vector value during an upcoming sleep window.

The term "in-sleep parasomnia episode likelihood prediction machine learning model" may refer to a data construct that describes parameters, hyper-parameters, and/or defined operations of a machine learning model that is configured to process an in-sleep model input that is generated based at least in part on the in-sleep individual monitoring data for an ongoing sleep window, the pre-sleep parasomnia episode likelihood score for a pre-sleep window that is associated with the ongoing sleep window, and/or a detected sleep stage for the ongoing sleep window in order to generate an in-sleep parasomnia episode likelihood score that describes a predicted likelihood that, during a current ongoing sleep window, a monitored individual is experiencing one or more parasomnia episodes. The in-sleep parasomnia episode likelihood prediction machine learning model may comprise a dense neural network and/or a fully-connected neural network. The output of the in-sleep parasomnia episode likelihood prediction machine learning model may comprise a vector, where a first value of the vector describes a likelihood that the monitored individual is experiencing a parasomnia episode during an ongoing sleep window and a second value of the vector describes a likelihood that the monitored individual is not experiencing a parasomnia episode during an ongoing sleep window. The output of the in-sleep parasomnia episode likelihood prediction machine learning model may comprise an atomic value that describes a likelihood that the monitored individual is experiencing a parasomnia episode during an ongoing sleep window and/or a likelihood that the monitored individual is not experiencing a parasomnia episode during an ongoing sleep window. The output of the in-sleep parasomnia episode likelihood prediction machine learning model may comprise a vector, where each value of the vector describes the likelihood that the monitored individual is experiencing a parasomnia episode having a parasomnia episode type that is associated with the vector value during an ongoing sleep window.

The term "pre-sleep static data vector" may refer to a data construct that is configured to describe feature data associated with a monitored individual that are determined independent of pre-sleep monitoring data for the pre-sleep window. Examples of such static feature data include: demographic feature data, hormone level feature data, healthcare data associated with the monitored individual that are extracted from one or more electronic medical records (EMRs) associated with the monitored individual, diagnosis code data associated with the monitored individual, and/or the like. In some embodiments, the pre-sleep static data vector comprises a predefined number of one-hot-coded static feature values, where each one-hot-coded static feature value is determined based at least in part on particular static feature data (e.g., demographic profile data, diagnosis code data, EMR data, and/or the like) associated with the monitored individual.

The term "pre-sleep ECG sequence" may refer to a data construct that is configured to describe a sequence of ECG measurement values, where: (i) each ECG measurement value may be recorded at a particular point-in-time of a covered time period that comprises the pre-sleep window, and (ii) the ordering of the sequence of ECG measurement values is determined based at least in part on a temporal ordering of point-in-times associated with the ECG measurement values. The pre-sleep ECG sequence may be determined based at least in part on monitoring data captured using an ECG sensor device, such as an ECG sensor device that captures ECG measurement values using electrodes placed on the skin of the monitored individual.

The term "wave feature sequence" may refer to a data construct that is configured to describe a sequence of features for P-QRS-T segments for an ECG sequence (e.g., a pre-sleep ECG sequence, an in-sleep ECG sequence, and/or the like). A wave feature sequence may be generated by generating a sequence of P-QRS-T segments based at least in part on the ECG sequence and then determining, for each P-QRS-T segment, features that describe respective placement of the P wave, the QRS complex, and the T wave in the P-QRS-T segment. For example, each value in the wave feature sequence may describe one or more of the following features for a corresponding P-QRS-T segment that is associated with the wave feature sequence value: the PR interval of the corresponding P-QRS-T segment that describes the time from the beginning of the P wave of the corresponding P-QRS-T segment to the beginning of the QRS complex of the corresponding P-QRS-T segment, a QT interval of the corresponding P-QRS-T segment that describes the time from the beginning of the QRS complex of the corresponding P-QRS-T segment to the end of the T wave of the corresponding P-QRS-T segment, one or more features (e.g., a time period) of the QRS complex of the corresponding P-QRS-T segment, one or more features (e.g., a time period) of the sub-segment of the corresponding P-QRS-T segment that begins with the end of the QRS complex of the corresponding P-QRS-T segment and ends with the end of the T wave of the corresponding P-QRS-T segment, one or more features (e.g., a time period) of subsegment of the corresponding P-QRS-T segment that begins with the end of the QRS complex of the corresponding P-QRS-T segment and ends with the beginning of the T wave of the corresponding P-QRS-T segment, one or more features (e.g., a time period) of an ST subsegment of the corresponding P-QRS-T segment, one or more features (e.g., a time period) of a PR subsegment of the corresponding P-QRS-T segment, and/or the like.

The term "heart rate feature sequence" may refer to a data construct that is configured to describe a sequence of heart rate values that are captured from an ECG sequence (e.g., a pre-sleep ECG sequence, an in-sleep ECG sequence, and/or the like). A heart rate feature sequence may be generated by generating a heart rate value for each ECG measurement value described by the ECG sequence. Once generated, a heart rate feature sequence may be processed by a heart rate feature processing recurrent neural network machine learning model to generate a heart-rate-based representation of a time window.

The term "pulse feature sequence" may refer to a data construct that is configured to describe a sequence of pulse rate values that are captured from an ECG sequence (e.g., a pre-sleep ECG sequence, an in-sleep ECG sequence, and/or the like). A pulse feature sequence may be generated by generating a pulse rate value for each ECG measurement value described by the ECG sequence. Once generated, a pulse feature sequence may be processed by a pulse feature processing recurrent neural network machine learning model to generate a pulse-based representation of a time window.

The term "EEG frequency domain sequence" may refer to a data construct that is configured to describe a sequence that is generated based at least in part on the output of mapping an ECG sequence to a frequency domain using one or more Fast Fourier Transform (FFT) operations. Once generated, an EEG frequency domain sequence may be processed using a convolutional neural network machine learning model 614 (e.g., a one-dimensional convolutional neural network machine learning model) to generate a convolutional EEG frequency domain sequence that is then processed by an EEG frequency domain processing recurrent neural network machine learning model to generate an EEG frequency domain representation.

The term "pre-sleep EEG sequence" may refer to a data construct that describes a sequence of EEG measurement values, where: (i) each ECG measurement value may be recorded at a particular point-in-time of a covered time period that comprises the pre-sleep window, and (ii) the ordering of the sequence of EEG measurement values is determined based at least in part on a temporal ordering of point-in-times associated with the EEG measurement values. The pre-sleep EEG sequence may be determined based at least in part on monitoring data captured using an EEG sensor device, such as an EEG sensor device that captures EEG measurement values using electrodes placed on the scalp of the monitored individual.

The term "pre-sleep medication intake sequence" may refer to a data construct that describes a sequence of values (e.g., a sequence of one-hot-coded values), where each value describes that during a covered time period comprising a pre-sleep window a particular medication has been consumed by the monitored individual, and where the ordering of the sequence is determined based at least in part on the temporal ordering of the medication intakes within the covered time period. Once the pre-sleep medication intake sequence is generated/obtained, the pre-sleep medication intake sequence is processed by a medication intake feature processing recurrent neural network to generate a medication intake representation of the pre-sleep window.

The term "prescribed medication list" may refer to a data construct that describes a list (e.g., an array, a linked list, and/or the like) of values (e.g., a list of one-hot-coded values), where each value describes a prescribed medication identifier and/or a prescribed medication name for the monitored individual that is prescribed for a covered period that comprises the pre-sleep window. Once generated, a prescribed medication list may be processed by a list embedding machine learning model (e.g., a text embedding machine learning model) to generate a prescribed medication embedding for the pre-sleep window. In some embodiments, when the list embedding machine learning model is a text embedding machine learning model, the prescribed medication list is a string that is generated by concatenating all of the prescription names for all prescribed drugs associated with the monitored individual. In some embodiments, inputs to the list embedding machine learning model include one or more vectors describing the prescribed medication list, while the outputs of the list embedding machine learning model include a vector describing a prescribed medication embedding for the pre-sleep window.

The term "pre-sleep historical representation" may refer to a data construct that describes feature data associated with a preceding time window for the pre-sleep window, such as feature data associated with a preceding night of the pre-sleep window, where the feature data may be generated based at least in part on the ECG data for the preceding time window, the EEG data for the preceding time window, the prescribed medication list for the preceding time window, the medication intake sequence data for the preceding time window, the target substance intake data for the preceding time window, and/or the like. In some embodiments, the pre-sleep historical representation is the model input of the pre-sleep parasomnia episode likelihood prediction machine learning model for a preceding time window for the pre-sleep window.

The term "pre-sleep target substance intake sequence" may refer to a data construct that describes a sequence of values (e.g., a sequence of one-hot-coded values), where each value describes that during a covered time period comprising the pre-sleep window a particular target substance (e.g., caffeine, alcohol, caffeine with a threshold-satisfying intake amount over a particular time interval, alcohol with a threshold-satisfying intake amount over a particular time interval, and/or the like) has been consumed by a monitored individual, and where the ordering of the sequence is determined based at least in part on the temporal ordering of the target substance intakes within the covered time period. Once the pre-sleep target substance intake sequence is generated/obtained, the pre-sleep target substance intake sequence may be processed by a target substance intake feature processing recurrent neural network to generate a target substance intake representation of the pre-sleep window.

The term "in-sleep static data vector" may refer to a data construct that describes feature data associated with the monitored individual that are determined independent of in-sleep monitoring data for the ongoing sleep window. Examples of such static feature data include: demographic feature data, hormone level feature data, healthcare data associated with the monitored individual that are extracted from one or more electronic medical records (EMRs) associated with the monitored individual, diagnosis code data associated with the monitored individual, and/or the like. In some embodiments, the in-sleep static data vector comprises a predefined number of one-hot-coded static feature values, where each one-hot-coded static feature value is determined based at least in part on particular static feature data (e.g., demographic profile data, diagnosis code data, EMR data, and/or the like) associated with the monitored individual. In some embodiments, the in-sleep static data vector further describes at least one of the pre-sleep parasomnia likelihood score for a pre-sleep window of the ongoing sleep window, the detected sleep stage of the ongoing sleep window, the detected sleep stage vector of the ongoing sleep window, feature data for a pre-sleep window of the ongoing sleep window, model input data of a pre-sleep parasomnia episode likelihood prediction machine learning model that is determined based at least in part on feature data of a pre-sleep window of the ongoing sleep window, and/or the like.

The term "in-sleep ECG sequence" may refer to a data construct that describes a sequence of ECG measurement values, where: (i) each ECG measurement value may be recorded at a particular point-in-time of a covered time period that comprises an ongoing sleep window, and (ii) the ordering of the sequence of ECG measurement values is determined based at least in part on a temporal ordering of point-in-times associated with the ECG measurement values. The in-sleep ECG sequence 712 may be determined based at least in part on monitoring data captured using an ECG sensor device, such as an ECG sensor device that captures ECG measurement values using electrodes placed on the skin of the monitored individual.

The term "in-sleep EEG sequence" may refer to a data construct that describes a sequence of EEG measurement values, where: (i) each ECG measurement value may be recorded at a particular point-in-time of a covered time period that comprises an ongoing sleep window, and (ii) the ordering of the sequence of EEG measurement values is determined based at least in part on a temporal ordering of point-in-times associated with the EEG measurement values. The in-sleep EEG sequence may be determined based at least in part on monitoring data captured using an EEG sensor device, such as an EEG sensor device that captures EEG measurement values using electrodes placed on the scalp of the monitored individual.

The term "in-sleep movement measurement sequence" may refer to a data construct that describes one or more body movement measures for the monitored individual during a covered time period that comprises the ongoing sleep window. For example, the in-sleep movement measurement sequence may determine a sequence of point-in-time pressure/weight sensor measurements recorded by one or more sensor devices connected to various locations on a mattress of the monitored individual. Once an in-sleep movement measurement sequence is generated/obtained, a movement measurement frequency domain sequence may be generated based at least in part on the output of mapping the in-sleep movement measurement sequence to a frequency domain using one or more Fast Fourier Transform (FFT) operations. Once generated, the movement measurement frequency domain sequence may be processed using a convolutional neural network machine learning model (e.g., a one-dimensional convolutional neural network machine learning model) to generate a movement measurement frequency domain sequence that is then processed by a movement measurement feature processing recurrent neural network machine learning model to generate an in-sleep movement-based representation.

The term "in-sleep bedside audio sequence" may refer to a data construct that describes one or more body audio features for a monitored environment of the monitored individual during a covered time period that comprises the ongoing sleep window. For example, the in-sleep bedside audio sequence may determine a sequence of point-in-time audio features measurements recorded by one or more microphone sensor devices connected to various locations of the monitored environment. Once an in-sleep bedside audio sequence is generated/obtained, a bedside audio frequency domain sequence may be generated based at least in part on the output of mapping the in-sleep bedside audio sequence to a frequency domain using one or more Fast Fourier Transform (FFT) operations. Once generated, a bedside audio frequency domain sequence may be processed using a convolutional neural network machine learning model (e.g., a one-dimensional convolutional neural network machine learning model) to generate a bedside audio frequency domain sequence that is then processed by a bedside audio feature processing recurrent neural network machine learning model to generate an in-sleep audio-based representation of an ongoing sleep window.

The term "in-sleep facial feature sequence" may refer to a data construct that describes a sequence of point-in-time images and/or image-based features captured based at least in part on output data of a camera device that is configured to capture images of the face of the monitored individual during a covered time period that comprises the ongoing sleep window. Once the in-sleep facial feature sequence is generated/obtained, an in-sleep facial feature sequence may be processed using an emotion detection machine learning model to detect an in-sleep emotional sequence that describes a sequence of emotional designations for the monitored individual during the covered time period. For example, the emotion detection machine learning model may process, for each time unit of the covered time, an emotional designation based at least in part on the facial image for the time unit, and then combine the emotional designations based at least in part on a temporal order of the time units to generate the in-sleep emotional sequence. As another example, the emotion detection machine learning model may process, for each time unit of the covered time, an emotional designation vector based at least in part on the facial image for the time unit, and then combine the emotional designation vectors based at least in part on a temporal order of the time units to generate the in-sleep emotional sequence. Once the in-sleep emotional sequence is generated/obtained, the in-sleep emotional sequence may be processed using a facial feature processing recurrent neural network machine learning model to generate an in-sleep emotional representation for the ongoing sleep window.

The term "in-sleep thermal camera output sequence" may refer to a data construct that describes a sequence of features determined based at least in part on the output of a thermal camera over a covered time period that includes the in-sleep time period. Once generated/obtained, an in-sleep thermal camera output sequence may be processed by a convolutional neural network machine learning model (e.g., a two-dimensional convolutional neural network machine learning model) to generate a convolutional thermal sequence. The convolutional thermal sequence may then be processed by a convolutional thermal sequence processing recurrent neural network machine learning model to generate a convolutional thermal sequence representation of the ongoing sleep window. Once generated/obtained, the in-sleep thermal camera output sequence may be used to generate a body temperature sequence that may describe a sequence of point-in-time body temperature measurement estimates for the monitored individual based at least in part on the sleep thermal camera output sequence. The body temperature sequence 749 may then be processed by a temperature feature processing recurrent neural network machine learning model to generate a temperature representation of the ongoing sleep window.

The term "recommended parasomnia reduction intervention" may refer to a data construct that describes a set of actions that are configured to reduce the likelihood of parasomnia episode occurrence during an ongoing sleep window and/or to reduce the effects of an occurred parasomnia episode on an individual. Examples of recommended parasomnia reduction interventions include: (i) recommended pre-sleep parasomnia reduction intervention, (ii) recommended in-sleep parasomnia reduction interventions, and (iii) recommended post-sleep parasomnia reduction interventions.

The term "recommended pre-sleep parasomnia reduction intervention" may refer to a data construct that describes a set of actions that, when performed (e.g., by a monitored individual) during a pre-sleep window, are configured to reduce the pre-sleep parasomnia episode likelihood score of the pre-sleep window with respect to a sleep window that follows the pre-sleep window. In some embodiments, to select a recommended pre-sleep parasomnia reduction intervention from a set of candidate pre-sleep parasomnia reduction interventions for a particular pre-sleep window, a pre-sleep parasomnia reduction intervention machine learning model may be used to generate a conditional likelihood score for each candidate pre-sleep parasomnia reduction intervention, and then the recommended pre-sleep parasomnia reduction intervention may be selected based at least in part on each conditional likelihood score. For example, the recommended pre-sleep parasomnia reduction intervention may be selected as the candidate pre-sleep parasomnia reduction intervention having the lowest conditional likelihood score of all of the conditional likelihood scores of the set of candidate pre-sleep parasomnia reduction interventions. As another example, the recommended pre-sleep parasomnia reduction intervention may be generated based at least in part on a combination of each candidate pre-sleep parasomnia reduction intervention whose conditional likelihood score satisfies (e.g., falls below) a conditional likelihood score threshold. In some embodiments, to select the recommended pre-sleep parasomnia reduction intervention from the set of candidate pre-sleep parasomnia reduction interventions for a pre-sleep window, a pre-sleep window representation of the pre-sleep window (e.g., a pre-sleep window representation that is determined based at least in part on a model input of a pre-sleep parasomnia episode likelihood prediction machine learning model for the pre-sleep window) is used to generate an existing state of the pre-sleep environment that may then be supplied to a deep reinforcement learning machine learning model, where the deep reinforcement machine learning model may be configured to select the recommended pre-sleep parasomnia reduction intervention in a manner that is configured to maximize a value generation sub-model (e.g., a Q function) of the deep reinforcement machine learning model given the existing state defined by the pre-sleep window representation.

The term "recommended in-sleep parasomnia reduction intervention" may refer to a data construct describes a set of electronic device operations that, when performed by particular electronic devices during an ongoing sleep window, modify a sleep environment of the ongoing sleep window to reduce the in-sleep parasomnia episode likelihood score for the sleep window. In some embodiments, to select a recommended in-sleep parasomnia reduction intervention from a set of candidate in-sleep parasomnia reduction interventions for a particular ongoing sleep window, an in-sleep parasomnia reduction intervention machine learning model may be used to generate a conditional likelihood score for each candidate in-sleep parasomnia reduction intervention, and then the recommended in-sleep parasomnia reduction intervention may be selected based at least in part on each conditional likelihood score. For example, the recommended in-sleep parasomnia reduction intervention may be selected as the candidate in-sleep parasomnia reduction intervention having the lowest conditional likelihood score of all of the conditional likelihood scores of the set of candidate in-sleep parasomnia reduction interventions. As another example, the recommended in-sleep parasomnia reduction intervention may be generated based at least in part on a combination of each candidate in-sleep parasomnia reduction intervention whose conditional likelihood score satisfies (e.g., falls below) a conditional likelihood score threshold. In some embodiments, to select the recommended in-sleep parasomnia reduction intervention from the set of candidate in-sleep parasomnia reduction interventions for an ongoing sleep window, an ongoing sleep time representation of the ongoing sleep window (e.g., an ongoing sleep time representation that is determined based at least in part on a model input of an in-sleep parasomnia episode likelihood prediction machine learning model for the ongoing sleep window) is used to generate an existing state of the environment that may then be supplied to a deep reinforcement learning machine learning model, where the deep reinforcement learning machine learning model may be configured to select the recommended in-sleep parasomnia reduction intervention in a manner that is configured to maximize a value generation sub-model (e.g., a Q function) of the deep reinforcement machine learning model given the existing state defined by the ongoing sleep time representation.

The term "recommended post-sleep parasomnia reduction intervention" may refer to a data construct that describes a set of actions that when performed (e.g., by a monitored individual) during a post-sleep window that follows an ongoing sleep window, are likely to reduce the harmful effects of a parasomnia episode that is detected/recorded to have occurred during the ongoing sleep window. In some embodiments, a recommended post-sleep parasomnia reduction intervention is selected from a set of candidate post-sleep parasomnia reduction interventions. In some of the noted embodiments, to select the recommended post-sleep parasomnia reduction intervention from the set of candidate pre-sleep parasomnia reduction interventions for a post-sleep window, a post-sleep window representation may be generated for the post-sleep window based at least in part on the ongoing sleep window representation for an ongoing sleep window that precedes the post-sleep window and/or the pre-sleep window representation for a pre-sleep window that precedes the ongoing sleep window. The post-sleep window representation may then be used to generate an existing state of the post-sleep environment that may then be supplied to a deep reinforcement learning machine learning model, where the deep reinforcement learning machine learning model may be configured to select the recommended post-sleep parasomnia reduction intervention in a manner that is configured to maximize a value generation sub-model (e.g., a Q function) of the deep reinforcement machine learning model given the existing state defined by the pre-sleep window representation.

The term "dynamically deployed parasomnia episode likelihood prediction machine learning model" may refer to a data construct that is configured to a parasomnia episode likelihood prediction machine learning model (e.g., an in-sleep parasomnia episode likelihood prediction machine learning model) whose expected input includes values corresponding to both statically-deployed features and dynamically-deployed features. The statically-deployed feature values may describe those feature values that can be interpreted without regard to the physical environment in which the parasomnia episode likelihood prediction machine learning model is used, while the dynamically-deployed feature values may describe those feature values whose interpretation is dependent on the physical environment in which the parasomnia episode likelihood prediction machine learning model is used. For example, the ECG sequence may correspond to a statically-deployed feature, because the EEG sequence of a monitored individual can be interpreted independently and without regard to the physical environment of the monitored individual. As another example, the beside audio sequence may correspond to a dynamically-deployed feature, as the significance of captured audio signals is a function of various physical environment features, such as the distance of the audio recording device to a monitored individual. Accordingly, in some embodiments, because the model input of a parasomnia episode likelihood prediction machine learning model is associated with statically-deployed features and dynamically-deployed features, a trained parasomnia episode likelihood prediction machine learning model that is trained in one physical environment cannot reliably be deployed in a second physical environment, as the predictive model developed through the training process with respect to the dynamically-deployed feature values may be physical-environment-specific. Accordingly, in some embodiments, a parasomnia episode likelihood prediction machine learning model is dynamically deployed in a new physical environment in the following manner: before sufficient training data entries for the new physical environment is obtained, parasomnia episode likelihood scores for particular time windows (e.g., particular pre-sleep windows, particular ongoing sleep windows, and/or the like) are generated using a preexisting parasomnia episode likelihood prediction machine learning model whose model input is not characterized by the dynamically-deployed features, but user feedback for the particular time windows is used to aggregate training data entries that are then used to train and deploy the parasomnia episode likelihood prediction machine learning model when sufficient training data entries are obtained/recorded for training the parasomnia episode likelihood prediction machine learning model.

The term "deployment indicator" may refer to a data construct that describes whether a dynamically-deployed parasomnia episode likelihood prediction machine learning model is deployed in a particular physical environment. In some embodiments, the deployment indicator for a dynamically-deployed parasomnia episode likelihood prediction machine learning model is either an affirmative deployment indicator describing that the parasomnia episode likelihood prediction machine learning model is deployed, or a negative deployment indicator describing that the parasomnia episode likelihood prediction machine learning model is not deployed. In some embodiments, the deployment indicator is determined based at least in part on whether the dynamically-deployed parasomnia episode likelihood prediction machine learning model is deployed, the dynamically-deployed parasomnia episode likelihood prediction machine learning model is deployed when one or more dynamic deployment conditions are satisfied, the one or more dynamic deployment conditions comprise a first condition requiring that a training data entry count of a training data entry set satisfies a training data entry count threshold, the parasomnia episode likelihood prediction machine learning model may be generated based at least in part on the training data entry set, and each training data entry in the training data entry set is associated with a training model input and a target model output.

The term "dynamic deployment condition" may refer to a data construct that describes a required condition that, if not satisfied, will prevent the deployment of a dynamically-deployed parasomnia episode likelihood prediction machine learning model is deployed in a particular physical environment to generate predictive inferences (e.g., parasomnia episode likelihood predictions) with respect to the particular physical environment. In some embodiments, the dynamically-deployed parasomnia episode likelihood prediction machine learning model is only deployed when a set of dynamic deployment conditions are satisfied, where the set of dynamic deployment conditions may comprise a first condition requiring that a training data entry count of a training data entry set that is used to generate the dynamically-deployed parasomnia episode likelihood prediction machine learning model satisfies (e.g., exceeds) a threshold. In some embodiments, the set of dynamic deployment conditions comprise other conditions, such as a second condition requiring that a deviation measure for the dynamically-deployed parasomnia episode likelihood prediction machine learning model and a centralized parasomnia episode likelihood prediction machine learning model satisfies a deviation measure threshold. In some embodiments, the centralized parasomnia episode likelihood prediction machine learning model is a parasomnia episode likelihood prediction machine learning model that is determined based at least in part on aggregating trained parameter data for one or more decentralized parasomnia episode likelihood prediction machine learning models and by using one or more federated learning techniques.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

To generate predictions, the predictive data analysis computing entity 106 may use data provided by one or more sensor devices 103 and/or by one or more database systems (e.g., one or more electronic medical record database systems). To perform prediction-based actions, the predictive data analysis computing entity 106 may send instructions/ signals to stimulation devices 104 and/or one or more client devices in order to cause the noted devices to perform prediction-based actions. An example of a prediction that may be generated by the predictive data analysis system 101 is a parasomnia episode likelihood score and/or a recommended parasomnia reduction intervention. An example of a prediction-based action that can be performed using the predictive data analysis system 101 is causing one or more simulation devices and/or one or more client devices to perform actions to modify a sleep environment of a monitored individual to a state defined by a recommended parasomnia reduction intervention.

Examples of sensory data that may be provided by the sensor devices 103 include at least one of ECG data for blood alcohol level measurements for an ongoing sleep window (e.g., as determined based at least in part on output data of an epidermal patch and/or wrist band sensor device), noradrenaline hormone level measurements for an ongoing sleep window (e.g., as determined based at least in part on output data of an epidermal patch sensor device), norepinephrine hormone level measurements for an ongoing sleep window (e.g., as determined based at least in part on output data of an epidermal patch sensor device), ECG/pulse measurements for an ongoing sleep window (e.g., as determined based at least in part on output data of EEG sensor device, such as an EEG sensor device connected to a wrist band of the monitored individual), EEG measurements for an ongoing sleep window (e.g., as determined based at least in part on output data of an EEG sensor device, such as an EEG sensor device connected to a head band of the monitored individual), electrooculogram (EOG) measurements for an ongoing sleep window (e.g., as determined based at least in part on output data of an EOG sensor device, such as an EOG sensor device connected to a face of the monitored individual), electromyogram (EMG) measurements for an ongoing sleep window (e.g., as determined based at least in part on output data of an EMG sensor device, such as an EMG sensor device connected to a face of the monitored individual), blood oxygen levels for an ongoing sleep window (as determined based at least in part on output data of a sensor device, such as a sensor device connected to a wrist band of the monitored individual), skin conductance response measurements for an ongoing sleep window (e.g., as determined based at least in part on output data of an epidermal patch sensor device), facial expression data for an ongoing sleep window (e.g., as determined based at least in part on output of an infrared camera), audio data for an ongoing sleep window (e.g., as determined based at least in part on output of a microphone recorder), ambient light data of a sleeping room for an ongoing sleep window, ambient temperature data of a sleeping room of an ongoing sleep window (e.g., as determined based at least in part on an air-conditioning system interface of an air-conditioning system of the sleeping room), smart speaker command data for an ongoing sleep window, and/or the like.

In some embodiments, the predictive data analysis system 101 is configured to cause performance of a recommended parasomnia reduction intervention, e.g., a set of actions that are configured to reduce the likelihood of parasomnia episode occurrence during an ongoing sleep window and/or to reduce the effects of an occurred parasomnia episode on an individual. Examples of recommended parasomnia reduction interventions include: (i) recommended pre-sleep parasomnia reduction intervention, (ii) recommended in-sleep parasomnia reduction interventions, and (iii) recommended post-sleep parasomnia reduction interventions.

In some embodiments, each candidate in-sleep parasomnia reduction intervention may be associated with an intervention vector that describes a unique combination of values for a set of operational parameter values. For example, a particular candidate in-sleep parasomnia reduction intervention may be associated with an intervention vector that describes a particular ambient light projection level, a particular vibration intensity, a particular ambient sound projection type (e.g., a particular music track, voice of the monitored individual, voice of a person close to the monitored individual, and/or the like), a particular ambient sound projection intensity level, a particular room temperature setpoint as set via an air conditioning system or other space heater system, a particular room temperature level for an environment of the candidate in-sleep parasomnia reduction intervention, and/or the like. If the particular candidate in-sleep parasomnia reduction intervention is adopted as the recommended in-sleep parasomnia reduction intervention, then an in-sleep environment of an ongoing sleep window may be modified using one or more electronic devices to set the lighting of the in-sleep environment in accordance with the particular ambient light projection level, set the vibration of a bed of the in-sleep environment in accordance with the particular vibration intensity, and broadcast audio data in the in-sleep environment in accordance with the particular ambient sound projection type and the particular ambient sound projection intensity level. An exemplary intervention vector may have the form $A_t=$[ambient_light_level, watch_vibration_intensity, ambient_sound_type, ambient_sound_intensity, . . . ]. In some embodiments, the particular room temperature level of a target physical environment may be set based at least in part on an optimal candidate in-sleep parasomnia reduction intervention that is determined to be best suited to reduce probability and/or intensity of occurrence of parasomnia episodes during a monitored sleep session of a target individual.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

FIG. 4 is a flowchart diagram of an example process for performing parasomnia-related predictive data analysis for a monitored individual. Via the various steps/operations of the process 400, a predictive data analysis computing entity 106 can use monitoring data associated with an individual to perform at least one of: (i) pre-sleep parasomnia episode likelihood prediction during a pre-sleep window, (ii) in-sleep parasomnia episode likelihood prediction during an ongoing sleep window, (iii) pre-sleep parasomnia reduction intervention recommendation, (iv) in-sleep parasomnia reduction intervention recommendation, (v) post-sleep parasomnia reduction intervention recommendation, and (vi) dynamic deployment of a parasomnia episode likelihood prediction machine learning model. However, while various embodiments of the present invention describe all of the described functionalities as being performed by a single computing entity, a person of ordinary skill in the relevant technology will recognize that each described functionality may be performed by any number of computing entities that may or may not include at least one computing entity used to perform one or more other described functionalities.

The process 400 begins at step/operation 401 when the predictive data analysis computing entity 106 obtains pre-sleep individual monitoring data for a pre-sleep window (e.g., a defined-length period of time prior to an expected/scheduled/detected sleep window of the monitored individual, such as a 12 hour period of time). Examples of pre-sleep individual monitoring data comprise at least one of an ECG sequence for a pre-sleep window, an EEG sequence for a pre-sleep window, a medication intake sequence for a pre-sleep window, a prescribed medication list for a pre-sleep window, a historical representation of a pre-sleep window that describes feature data associated with a preceding time window for the pre-sleep window, and a target substance intake sequence for a pre-sleep window.

At step/operation 402, the predictive data analysis computing entity 106 processes the pre-sleep individual monitoring data using a pre-sleep parasomnia episode likelihood prediction machine learning model to generate a pre-sleep parasomnia episode likelihood score for the pre-sleep window. The pre-sleep parasomnia episode likelihood prediction machine learning model may be configured to process a pre-sleep model input that may be generated based at least in part on the pre-sleep individual monitoring data for a pre-sleep window in order to generate a pre-sleep parasomnia episode likelihood score that describes a predicted likelihood that a sleep window following the pre-sleep window causes occurrence of one or more parasomnia episodes. In some embodiments, generating a pre-sleep parasomnia episode likelihood score is performed in accordance with the process 500 that is described below in Subsection A of the present Section V.

In some embodiments, a pre-sleep parasomnia episode likelihood prediction machine learning model is an example of a parasomnia episode likelihood prediction machine learning model that can, in some embodiments, be dynamically deployed. Examples of dynamic deployment techniques for parasomnia episode likelihood prediction machine learning models are described in Subsection F of the present Section V.

At step/operation 403, the predictive data analysis computing entity 106 obtains in-sleep individual monitoring data for an ongoing sleep window (e.g., a defined-length period of time during an expected/scheduled/detected sleep window of the monitored individual, such as 10 minute period of time). Examples of in-sleep individual monitoring data comprise at least one of ECG data for blood alcohol level measurements for an ongoing sleep window (e.g., as determined based at least in part on output data of an epidermal patch and/or wrist band sensor device), noradrenaline hormone level measurements for an ongoing sleep window (e.g., as determined based at least in part on output data of an epidermal patch sensor device), norepinephrine hormone level measurements for an ongoing sleep window (e.g., as determined based at least in part on output data of an epidermal patch sensor device), ECG/pulse measurements for an ongoing sleep window (e.g., as determined based at least in part on output data of EEG sensor device, such as an EEG sensor device connected to a wrist band of the monitored individual), EEG measurements for an ongoing sleep window (e.g., as determined based at least in part on output data of an EEG sensor device, such as an EEG sensor device connected to a head band of the monitored individual), electrooculogram (EOG) measurements for an ongoing sleep window (e.g., as determined based at least in part on output data of an EOG sensor device, such as an EOG sensor device connected to a face of the monitored individual), electromyogram (EMG) measurements for an ongoing sleep window (e.g., as determined based at least in part on output data of an EMG sensor device, such as an EMG sensor device connected to a face of the monitored individual), blood oxygen levels for an ongoing sleep window (as determined based at least in part on output data of a sensor device, such as a sensor device connected to a wrist band of the monitored individual), skin conductance response measurements for an ongoing sleep window (e.g., as determined based at least in part on output data of an epidermal patch sensor device), facial expression data for an ongoing sleep window (e.g., as determined based at least in part on output of an infrared camera), audio data for an ongoing sleep window (e.g., as determined based at least in part on output of a microphone recorder), ambient light data of a sleeping room for an ongoing sleep window, ambient temperature data of a sleeping room of an ongoing sleep window (e.g., as determined based at least in part on an air-conditioning system interface of an air-conditioning system of the sleeping room), smart speaker command data for an ongoing sleep window, and/or the like.

At step/operation 404, the predictive data analysis computing entity 106 determines a detected sleep stage for the ongoing sleep window based at least in part on the in-sleep individual monitoring data for the ongoing sleep window. The sleep stage may be selected from a set of potential sleep stages, where the set of potential sleep stages may include at least one of a rapid eye movement (REM) sleep stage, a non-REM sleep stage, an awakened stage, a deep sleep stage, a gradual awakening stage, and/or the like. In some embodiments, the sleep stage is determined based at least in part on processing the in-sleep individual monitoring data using a sleep stage detection machine learning model to generate the detected sleep stage. In some embodiments, the inputs to the sleep stage detection machine learning model include at least one vector describing in-sleep individual monitoring data for the ongoing sleep window, while output of the sleep stage detection machine learning model include a vector that describes, with each vector value of n vector values, the predicted likelihood that the ongoing sleep window is associated with a respective sleep stage of n potential sleep stages.

At step/operation 405, the predictive data analysis computing entity 106 determines, based at least in part on the pre-sleep parasomnia episode likelihood score, the ongoing sleep window, and the detected sleep stage, and using a pre-sleep parasomnia episode likelihood prediction machine learning model, an in-sleep parasomnia episode likelihood score for the ongoing sleep window. The in-sleep parasomnia episode likelihood prediction machine learning model may be configured to process an in-sleep model input that may be generated based at least in part on the in-sleep individual monitoring data for an ongoing sleep window, the pre-sleep parasomnia episode likelihood score for a pre-sleep window that is associated with the ongoing sleep window, and/or a detected sleep stage for the ongoing sleep window in order to generate an in-sleep parasomnia episode likelihood score that describes a predicted likelihood that, during a current ongoing sleep window, a monitored individual is experiencing one or more parasomnia episodes. In some embodiments, generating an in-sleep parasomnia episode likelihood score is performed in accordance with the process 700 that is described below in Subsection B of the present Section V.

In some embodiments, an in-sleep parasomnia episode likelihood prediction machine learning model is an example of a parasomnia episode likelihood prediction machine learning model that can, in some embodiments, be dynamically deployed. Examples of dynamic deployment techniques for parasomnia episode likelihood prediction machine learning models are described in Subsection F of the present Section V.

At step/operation 406, the predictive data analysis computing entity 106 determines (e.g., in response to determining that the in-sleep parasomnia episode likelihood score satisfies an in-sleep parasomnia episode likelihood score threshold) a recommended parasomnia reduction intervention for the ongoing sleep window (referred to herein as a recommended in-sleep parasomnia reduction intervention). In some embodiments, a recommended parasomnia reduction intervention may describe a set of actions that are configured to reduce the likelihood of parasomnia episode occurrence during an ongoing sleep window and/or to reduce the effects of an occurred parasomnia episode on an individual. Examples of recommended parasomnia reduction interventions include: (i) recommended pre-sleep parasomnia reduction intervention, (ii) recommended in-sleep parasomnia reduction interventions, and (iii) recommended post-sleep parasomnia reduction interventions.

In some embodiments, a recommended pre-sleep parasomnia reduction intervention describes a set of actions that, when performed (e.g., by a monitored individual) during a pre-sleep window, are configured to reduce the pre-sleep parasomnia episode likelihood score of the pre-sleep window with respect to a sleep window that follows the pre-sleep window. Exemplary techniques for generating pre-sleep parasomnia reduction interventions are described in Subsection C of the present Section V.

In some embodiments, a recommended in-sleep parasomnia reduction intervention describes a set of electronic device operations that, when performed by particular electronic devices during an ongoing sleep window, modify a sleep environment of the ongoing sleep window to reduce the in-sleep parasomnia episode likelihood score for the sleep window. Exemplary techniques for generating in-sleep parasomnia reduction interventions are described in Subsection D of the present Section V.

In some embodiments, a recommended post-sleep parasomnia reduction intervention describes a set of actions that when performed (e.g., by a monitored individual) during a post-sleep window that follows an ongoing sleep window, are likely to reduce the harmful effects of a parasomnia episode that is detected/recorded to have occurred during the ongoing sleep window. Exemplary techniques for generating post-sleep parasomnia reduction interventions are described in Subsection E of the present Section V.

At step/operation 407, the predictive data analysis computing entity 106 causes one or more electronic devices in the in-sleep environment of the ongoing sleep window to perform the recommended parasomnia reduction intervention. In some embodiments, the operations of the electronic devices are configured to deliver arousal stimulus to the monitored individual in a gradual manner. In some embodiments, the electronic devices comprise one or more stimulus generators such as one or more audio stimulus generators (e.g., audio stimulus generators broadcasting pre-recorded audio data, auto-generated audio data such as audio data generated using a generative adversarial network, and/or the like), one or more tactile stimulus generators, one or more visual (e.g., light) stimulus generators, and/or the like.

At step/operation 408, subsequent to the execution of operations corresponding to the recommended parasomnia reduction intervention, the predictive data analysis computing entity 106 determines whether a new in-sleep parasomnia episode likelihood score that is determined based at least in part on a newly-captured ongoing sleep window that occurs after performance of the recommended parasomnia reduction intervention satisfies (e.g., falls below) the in-sleep parasomnia episode likelihood score threshold. If so, the predictive data analysis computing entity 106 proceeds to, at step/operation 409, record this observation about effectiveness of the recommended parasomnia reduction intervention among the feedback data that may then be used to update/retrain/regenerate models used to generate recommended parasomnia reduction interventions. However, if the new in-sleep parasomnia episode likelihood score fails to satisfy the in-sleep parasomnia episode likelihood score, the predictive data analysis computing entity 106 proceeds to generate a new recommended parasomnia reduction intervention based at least in part on the ongoing sleep window representation of the newly-captured ongoing sleep window.

A. Generating Pre-Sleep Parasomnia Episode Likelihood Scores

FIG. 5 is a data flow diagram of an example process 500 for generating a pre-sleep parasomnia episode likelihood score 571 for a monitored individual. As depicted in FIG. 5, the pre-sleep individual monitoring data 501 used to generate a pre-sleep parasomnia episode likelihood score 571 include: (i) a pre-sleep static data vector 511 for the monitored individual, (ii) a pre-sleep ECG sequence 512 for the pre-sleep window, (iii) a pre-sleep EEG sequence 513 for the pre-sleep window, (iv) a pre-sleep medication intake sequence 514 for the pre-sleep window, (v) a prescribed medication list 515 for the pre-sleep window, (vi) a pre-sleep historical representation 516 of a pre-sleep window that describes feature data associated with a preceding time window for the pre-sleep window, and (vii) a pre-sleep target substance intake sequence 517 for the pre-sleep window. A person of ordinary skill in the relevant technology will recognize that all operations described herein (with respect to FIG. 5 or other figures) as being performed by a recurrent neural network machine learning model can be performed by using one or more machine learning models that may include machine learning models other than recurrent neural network machine learning models (e.g., that may include, for example, fully connected feedforward neural network machine learning models).

The pre-sleep static data vector 511 may describe static feature data associated with the monitored individual that are determined independent of pre-sleep monitoring data for the pre-sleep window. Examples of such static feature data include: demographic feature data, hormone level feature data, healthcare data associated with the monitored individual that are extracted from one or more electronic medical records (EMRs) associated with the monitored individual, diagnosis code data associated with the monitored individual, and/or the like. In some embodiments, the pre-sleep static data vector 511 comprises a predefined number of one-hot-coded static feature values, where each one-hot-coded static feature value is determined based at least in part on particular static feature data (e.g., demographic profile data, diagnosis code data, EMR data, and/or the like) associated with the monitored individual.

The pre-sleep ECG sequence 512 may describe a sequence of ECG measurement values, where: (i) each ECG measurement value may be recorded at a particular point-in-time of a covered time period that comprises the pre-sleep window, and (ii) the ordering of the sequence of ECG measurement values is determined based at least in part on a temporal ordering of point-in-times associated with the ECG measurement values. The pre-sleep ECG sequence 512 may be determined based at least in part on monitoring data captured using an ECG sensor device, such as an ECG sensor device that captures ECG measurement values using electrodes placed on the skin of the monitored individual. In some embodiments, the covered time period for the pre-sleep ECG sequence 512 is different from the covered time period for at least one other pre-sleep individual monitoring data type discussed in this Subsection.

As depicted in FIG. 5, the pre-sleep ECG sequence 512 may be processed by a pre-sleep ECG sequence processing machine learning framework 521 to generate a set of pre-sleep ECG representations 531. In some embodiments, each pre-sleep ECG representation is a representation of the pre-sleep window that may be generated based at least in part on the ECG sequence for the pre-sleep window. In some embodiments, generating the set of pre-sleep ECG representations 531 for a pre-sleep window based at least in part on the pre-sleep ECG sequence 512 for the pre-sleep window may be performed using a pre-sleep ECG sequence processing machine learning framework 521, such as the pre-sleep ECG sequence processing machine learning framework 521 that is depicted in FIG. 6 and described in greater detail below. As depicted in FIG. 6, the pre-sleep ECG sequence processing machine learning framework 521 first extracts the following sequences from the pre-sleep ECG sequence 512: (i) a wave feature sequence 601, (ii) a heart rate feature sequence 602, (iii) a pulse feature sequence 603, and (iv) an EEG frequency domain sequence 604.

The wave feature sequence 601 may be generated by generating a sequence of P-QRS-T segments based at least in part on the pre-sleep ECG sequence 512 and then determining, for each P-QRS-T segment, features that describe respective placement of the P wave, the QRS complex, and the T wave in the P-QRS-T segment. For example, each value in the wave feature sequence 601 may describe one or more of the following features for a corresponding P-QRS-T segment that is associated with the wave feature sequence value: the PR interval of the corresponding P-QRS-T segment that describes the time from the beginning of the P wave of the corresponding P-QRS-T segment to the beginning of the QRS complex of the corresponding P-QRS-T segment, a QT interval of the corresponding P-QRS-T segment that describes the time from the beginning of the QRS complex of the corresponding P-QRS-T segment to the end of the T wave of the corresponding P-QRS-T segment, one or more features (e.g., a time period) of the QRS complex of the corresponding P-QRS-T segment, one or more features (e.g., a time period) of the sub-segment of the corresponding P-QRS-T segment that begins with the end of the QRS complex of the corresponding P-QRS-T segment and ends with the end of the T wave of the corresponding P-QRS-T segment, one or more features (e.g., a time period) of the subsegment of the corresponding P-QRS-T segment that begins with the end of the QRS complex of the corresponding P-QRS-T segment and ends with the beginning of the T wave of the corresponding P-QRS-T segment, one or more features (e.g., a time period) of an ST subsegment of the corresponding P-QRS-T segment, one or more features (e.g., a time period) of a PR subsegment of the corresponding P-QRS-T segment, and/or the like.

Once generated, the wave feature sequence 601 may be processed by a wave feature processing recurrent neural network machine learning model 611 to generate a wave-based representation 621 of the pre-sleep window, which may be an example of a pre-sleep ECG representation. The wave feature processing recurrent neural network machine learning model 611 may be configured, at each nth non-initial timestep of a set of timesteps, process an nth value (e.g., an atomic value, a vector, and/or the like) of the wave feature sequence 601 and a hidden state value of a preceding timestep to generate a hidden state, where the wave-based representation 621 may be generated based at least in part on a hidden state of a final timestep of the set of timesteps. In some embodiments, during an initial timestep, the wave feature processing recurrent neural network machine learning model 611 is configured to process a first value of the wave feature sequence 601 and a default hidden state value to generate a hidden state, where the hidden state may then be passed as an input to a second timestep of the wave feature processing recurrent neural network machine learning model 611. In some embodiments, the wave feature processing recurrent neural network machine learning model 611 comprises at least one of a conventional recurrent neural network, a long short term memory recurrent neural network, a gated recurrent unit recurrent neural network, and/or the like. In some embodiments, each hidden state of a timestep of the wave feature processing recurrent neural network machine learning model 611 is a vector.

The heart rate feature sequence 602 may be generated by generating a heart rate value for each ECG measurement value described by the pre-sleep ECG sequence 512. Once generated, the heart rate feature sequence 602 may be processed by a heart rate feature processing recurrent neural network machine learning model 612 to generate a heart-rate-based representation 622 of the pre-sleep window, which may be an example of a pre-sleep ECG representation. The heart rate feature processing recurrent neural network machine learning model 612 may be configured, at each nth non-initial timestep of a set of timesteps, process an nth value (e.g., an atomic value, a vector, and/or the like) of the heart rate feature sequence 602 and a hidden state value of a preceding timestep to generate a hidden state, where the heart-rate-based representation 622 may be generated based at least in part on a hidden state of a final timestep of the set of timesteps. In some embodiments, during an initial timestep, the heart rate feature processing recurrent neural network machine learning model 612 is configured to process a first value of the heart rate feature sequence 602 and a default hidden state value to generate a hidden state, where the hidden state may then be passed as an input to a second timestep of the heart rate feature processing recurrent neural network machine learning model 612. In some embodiments, the heart rate feature processing recurrent neural network machine learning model 612 comprises at least one of a conventional recurrent neural network, a long short term memory recurrent neural network, a gated recurrent unit recurrent neural network, and/or the like. In some embodiments, each hidden state of a timestep of the heart rate feature processing recurrent neural network machine learning model 612 is a vector.

The pulse feature sequence 603 may be generated by generating a pulse rate value for each ECG measurement value described by the pre-sleep ECG sequence 512. Once generated, the pulse feature sequence 603 may be processed by a pulse feature processing recurrent neural network machine learning model 613 to generate a pulse-based representation 623 of the pre-sleep window, which may be an example of a pre-sleep ECG representation. The pulse feature processing recurrent neural network machine learning model 613 may be configured, at each nth non-initial timestep of a set of timesteps, process an nth value (e.g., an atomic value, a vector, and/or the like) of the pulse feature sequence 603 and a hidden state value of a preceding timestep to generate a hidden state, where the pulse-based representation 623 may be generated based at least in part on a hidden state of a final timestep of the set of timesteps. In some embodiments, during an initial timestep, the pulse feature processing recurrent neural network machine learning model 613 is configured to process a first value of the pulse feature sequence 603 and a default hidden state value to generate a hidden state, where the hidden state may then be passed as an input to a second timestep of the pulse feature processing recurrent neural network machine learning model 613. In some embodiments, the pulse feature processing recurrent neural network machine learning model 613 comprises at least one of a conventional recurrent neural network, a long short term memory recurrent neural network, a gated recurrent unit recurrent neural network, and/or the like. In some embodiments, each hidden state of a timestep of the pulse feature processing recurrent neural network machine learning model 613 is a vector.

The EEG frequency domain sequence 604 may be generated based at least in part on the output of mapping the pre-sleep ECG sequence 512 to a frequency domain using one or more Fast Fourier Transform (FFT) operations. Once generated, the EEG frequency domain sequence 604 may be processed using a convolutional neural network machine learning model 614 (e.g., a one-dimensional convolutional neural network machine learning model) to generate a convolutional EEG frequency domain sequence that may then be processed by an EEG frequency domain processing recurrent neural network machine learning model 615 to generate an EEG frequency domain representation 624, which may be an example of a pre-sleep ECG representation. The EEG frequency domain processing recurrent neural network machine learning model 615 may be configured, at each nth non-initial timestep of a set of timesteps, process an nth value (e.g., an atomic value, a vector, and/or the like) of the convolutional EEG frequency domain sequence and a hidden state value of a preceding timestep to generate a hidden state, where the EEG frequency domain representation 624 may be generated based at least in part on a hidden state of a final timestep of the set of timesteps. In some embodiments, during an initial timestep, the EEG frequency domain processing recurrent neural network machine learning model 615 is configured to process a first value of the convolutional EEG frequency domain sequence and a default hidden state value to generate a hidden state, where the hidden state may then be passed as an input to a second timestep of the EEG frequency domain processing recurrent neural network machine learning model 615. In some embodiments, the EEG frequency domain processing recurrent neural network machine learning model 615 comprises at least one of a conventional recurrent neural network, a long short term memory recurrent neural network, a gated recurrent unit recurrent neural network, and/or the like. In some embodiments, each hidden state of a timestep of the EEG frequency domain processing recurrent neural network machine learning model 615 is a vector.

Returning to FIG. 5, the pre-sleep EEG sequence 513 may describe a sequence of EEG measurement values, where: (i) each ECG measurement value may be recorded at a particular point-in-time of a covered time period that comprises the pre-sleep window, and (ii) the ordering of the sequence of EEG measurement values is determined based at least in part on a temporal ordering of point-in-times associated with the EEG measurement values. The pre-sleep EEG sequence 513 may be determined based at least in part on monitoring data captured using an EEG sensor device, such as an EEG sensor device that captures EEG measurement values using electrodes placed on the scalp of the monitored individual. In some embodiments, the covered time period for the pre-sleep EEG sequence 513 is different from the covered time period for at least one other pre-sleep individual monitoring data type discussed in this Subsection.

Once the pre-sleep EEG sequence 513 is generated/obtained, an EEG frequency domain sequence 541 may be generated based at least in part on the output of mapping the pre-sleep EEG sequence 513 to a frequency domain using one or more Fast Fourier Transform (FFT) operations. Once generated, the EEG frequency domain sequence 541 may be processed using a convolutional neural network machine learning model (e.g., a one-dimensional convolutional neural network machine learning model) to generate a convolutional EEG frequency domain sequence 542 that may then be processed by an EEG feature processing recurrent neural network machine learning model 522 to generate a pre-sleep EEG-based representation 532. The EEG feature processing recurrent neural network machine learning model 522 may be configured, at each nth non-initial timestep of a set of timesteps, process an nth value (e.g., an atomic value, a vector, and/or the like) of the convolutional EEG frequency domain sequence 542 and a hidden state value of a preceding timestep to generate a hidden state, where the pre-sleep EEG-based representation 532 may be generated based at least in part on a hidden state of a final timestep of the set of timesteps. In some embodiments, during an initial timestep, the EEG feature processing recurrent neural network machine learning model 522 is configured to process a first value of the convolutional EEG frequency domain sequence 542 and a default hidden state value to generate a hidden state, where the hidden state may then be passed as an input to a second timestep of the EEG feature processing recurrent neural network machine learning model 522. In some embodiments, the EEG feature processing recurrent neural network machine learning model 522 comprises at least one of a conventional recurrent neural network, a long short term memory recurrent neural network, a gated recurrent unit recurrent neural network, and/or the like. In some embodiments, each hidden state of a timestep of the EEG feature processing recurrent neural network machine learning model 522 is a vector.

The pre-sleep medication intake sequence 514 may describe a sequence of values (e.g., a sequence of one-hot-coded values), where each value describes that during a covered time period comprising the pre-sleep window a particular medication has been consumed by the monitored individual, and where the ordering of the sequence is determined based at least in part on the temporal ordering of the medication intakes within the covered time period. In some embodiments, the covered time period for the pre-sleep medication intake sequence 514 is different from the covered time period for at least one other pre-sleep individual monitoring data type discussed in this Subsection.

Once the pre-sleep medication intake sequence 514 is generated/obtained, the pre-sleep medication intake sequence 514 may be processed by a medication intake feature processing recurrent neural network 523 to generate a medication intake representation 533 of the pre-sleep window. The medication intake feature processing recurrent neural network 523 may be configured, at each nth non-initial timestep of a set of timesteps, process an nth value (e.g., an atomic value, a vector, and/or the like) of the pre-sleep medication intake sequence 514 and a hidden state value of a preceding timestep to generate a hidden state, where the medication intake representation 533 may be generated based at least in part on a hidden state of a final timestep of the set of timesteps. In some embodiments, during an initial timestep, the medication intake feature processing recurrent neural network 523 is configured to process a first value of the pre-sleep medication intake sequence 514 and a default hidden state value to generate a hidden state, where the hidden state may then be passed as an input to a second timestep of the medication intake feature processing recurrent neural network 523. In some embodiments, the medication intake feature processing recurrent neural network 523 comprises at least one of a conventional recurrent neural network, a long short term memory recurrent neural network, a gated recurrent unit recurrent neural network, and/or the like. In some embodiments, each hidden state of a timestep of the medication intake feature processing recurrent neural network 523 is a vector.

The prescribed medication list 515 may describe a list (e.g., an array, a linked list, and/or the like) of values (e.g., a list of one-hot-coded values), where each value describes a prescribed medication identifier and/or a prescribed medication name for the monitored individual that is prescribed for a covered period that comprises the pre-sleep window. In some embodiments, the prescribed medication list 515 is determined based at least in part on the EMR data associated with the monitored individual. In some embodiments, the covered time period for the prescribed medication list 515 is different from the covered time period for at least one other pre-sleep individual monitoring data type discussed in this Subsection.

Once generated, the prescribed medication list 515 may be processed by a list embedding machine learning model 581 (e.g., a text embedding machine learning model) to generate a prescribed medication embedding 534 for the pre-sleep window. In some embodiments, when the list embedding machine learning model is a text embedding machine learning model, the prescribed medication list 515 is a string that may be generated by concatenating all of the prescription names for all prescribed drugs associated with the monitored individual. In some embodiments, inputs to the list embedding machine learning model include one or more vectors describing the prescribed medication list 515, while the outputs of the list embedding machine learning model include a vector describing a prescribed medication embedding 534 for the pre-sleep window.

The pre-sleep historical representation 516 may describe feature data associated with a preceding time window for the pre-sleep window, such as feature data associated with a preceding night of the pre-sleep window, where the feature data may be generated based at least in part on the ECG data for the preceding time window, the EEG data for the preceding time window, the prescribed medication list for the preceding time window, the medication intake sequence data for the preceding time window, the target substance intake data for the preceding time window, and/or the like.

In some embodiments, the pre-sleep historical representation 516 is the model input of the pre-sleep parasomnia episode likelihood prediction machine learning model for a preceding time window for the pre-sleep window.

The pre-sleep target substance intake sequence 517 may describe a sequence of values (e.g., a sequence of one-hot-coded values), where each value describes that during a covered time period comprising the pre-sleep window a particular target substance (e.g., caffeine, alcohol, caffeine with a threshold-satisfying intake amount over a particular time interval, alcohol with a threshold-satisfying intake amount over a particular time interval, and/or the like) has been consumed by the monitored individual, and where the ordering of the sequence is determined based at least in part on the temporal ordering of the target substance intakes within the covered time period. In some embodiments, the covered time period for the pre-sleep target substance intake sequence 517 is different from the covered time period for at least one other pre-sleep individual monitoring data type discussed in this Subsection.

Once the pre-sleep target substance intake sequence 517 is generated/obtained, the pre-sleep target substance intake sequence 517 may be processed by a target substance intake feature processing recurrent neural network 524 to generate a target substance intake representation 535 of the pre-sleep window. The target substance intake feature processing recurrent neural network 524 may be configured, at each nth non-initial timestep of a set of timesteps, process an nth value (e.g., an atomic value, a vector, and/or the like) of the pre-sleep target substance intake sequence 517 and a hidden state value of a preceding timestep to generate a hidden state, where the target substance intake representation 535 may be generated based at least in part on a hidden state of a final timestep of the set of timesteps. In some embodiments, during an initial timestep, the target substance intake feature processing recurrent neural network 524 is configured to process a first value of the pre-sleep target substance intake sequence 517 and a default hidden state value to generate a hidden state, where the hidden state may then be passed as an input to a second timestep of the target substance intake feature processing recurrent neural network 524. In some embodiments, the target substance intake feature processing recurrent neural network 524 comprises at least one of a conventional recurrent neural network, a long short term memory recurrent neural network, a gated recurrent unit recurrent neural network, and/or the like. In some embodiments, each hidden state of a timestep of the target substance intake feature processing recurrent neural network 524 is a vector.

The pre-sleep target substance intake sequence 517 may also be used to determine a total target substance consumption measurement 536 that describes a total consumption of one or more target substances within the covered time period that is associated with the pre-sleep target substance intake sequence 517. Then, the pre-sleep static data vector 511, the set of pre-sleep ECG representations 531, the pre-sleep EEG-based representation 532, the medication intake representation 533, the prescribed medication embedding 534, the pre-sleep historical representation 516, the target substance intake representation 535, and the total target substance consumption measurement 536 are combined (e.g., concatenated, merged, averaged, summed up, and/or the like) by a feature merging machine learning model 582 to generate a model input 551 for the pre-sleep parasomnia episode likelihood prediction machine learning model 561. The inputs to the feature merging machine learning model may include n inputs, where each input may be a vector or an atomic value, while the outputs of the feature merging machine learning model may include a model input vector.

The model input for the pre-sleep parasomnia episode likelihood prediction machine learning model 561 may then be processed by the pre-sleep parasomnia episode likelihood prediction machine learning model 561 to generate the pre-sleep parasomnia episode likelihood score 571 for a monitored individual for the pre-sleep window. The pre-sleep parasomnia episode likelihood prediction machine learning model 561 may comprise a dense neural network and/or a fully-connected neural network. The output of the pre-sleep parasomnia episode likelihood prediction machine learning model 561 may comprise a vector, where a first value of the vector describes a likelihood that the monitored individual will suffer from a parasomnia episode during an upcoming sleep window and a second value of the vector describes a likelihood that the monitored individual will not suffer from a parasomnia episode during an upcoming sleep window. The output of the pre-sleep parasomnia episode likelihood prediction machine learning model 561 may comprise an atomic value that describes a likelihood that the monitored individual will suffer from a parasomnia episode during an upcoming sleep window and/or a likelihood that the monitored individual will not suffer from a parasomnia episode during an upcoming sleep window. The output of the pre-sleep parasomnia episode likelihood prediction machine learning model 561 may comprise a vector, where each value of the vector describes the likelihood that the monitored individual will suffer from a parasomnia episode having a parasomnia episode type that is associated with the vector value during an upcoming sleep window.

As described herein, various embodiments of the present invention improve real-time efficiency of performing parasomnia-related predictive data analysis for a monitored individual by introducing techniques that enable integrating pre-sleep predictive inferences into in-sleep predictive inferences in order to generate in-sleep predictive inferences faster. For example, in some embodiments, both pre-sleep models and in-sleep models are configured to process data having common feature types, such as an ECG feature sequence, an EGG feature sequence, and/or the like. By using this technique, various embodiments of the present invention impose a conceptual relationship between the predictive inferences performed by pre-sleep models and predictive inferences performed by in-sleep models, which in turn makes pre-sleep predictive inferences more pertinent to in-sleep predictive inferences and thus enables making in-sleep models more efficient and faster by integrating pre-sleep predictive inferences into such models. This is critical for operational reliability of real-time parasomnia detection/intervention models, as due to health reasons time is of the essence when it comes to harm reduction objectives of such models. Accordingly, various embodiments of the present invention make important technical contributions to improving real-time efficiency of performing parasomnia-related predictive data analysis for a monitored individual by introducing techniques that facilitate effective integration of pre-sleep feedback into in-sleep predictive inferences of parasomnia detection/intervention models.

B. Generating In-Sleep Parasomnia Episode Likelihood Scores

FIG. 7 is a data flow diagram of an example process 700 for generating an in-sleep parasomnia episode likelihood score 771 for a monitored individual. As depicted in FIG. 7, the in-sleep individual monitoring data 701 used to generate an in-sleep parasomnia episode likelihood score 771 include: (i) an in-sleep static data vector 711 for the monitored individual, (ii) an in-sleep ECG sequence 712 for the ongoing sleep window, (iii) an in-sleep EEG sequence 713 for the ongoing sleep window, (iv) an in-sleep movement measurement sequence 714 for the ongoing sleep window, (v) an in-sleep bedside audio sequence 715 for the ongoing sleep window, (vi) an in-sleep facial feature sequence 716 for the ongoing sleep window, and (vii) an in-sleep thermal camera output sequence 717 for the ongoing sleep window.

The in-sleep static data vector 711 may describe static feature data associated with the monitored individual that are determined independent of in-sleep monitoring data for the ongoing sleep window. Examples of such static feature data include: demographic feature data, hormone level feature data, healthcare data associated with the monitored individual that are extracted from one or more electronic medical records (EMRs) associated with the monitored individual, diagnosis code data associated with the monitored individual, and/or the like. In some embodiments, the in-sleep static data vector 711 comprises a predefined number of one-hot-coded static feature values, where each one-hot-coded static feature value is determined based at least in part on particular static feature data (e.g., demographic profile data, diagnosis code data, EMR data, and/or the like) associated with the monitored individual. In some embodiments, the in-sleep static data vector 711 further describes at least one of the pre-sleep parasomnia likelihood score for a pre-sleep window of the ongoing sleep window, the detected sleep stage of the ongoing sleep window, the detected sleep stage vector of the ongoing sleep window, feature data for a pre-sleep window of the ongoing sleep window, model input data of a pre-sleep parasomnia episode likelihood prediction machine learning model that is determined based at least in part on feature data of a pre-sleep window of the ongoing sleep window, and/or the like.

The in-sleep ECG sequence 712 may describe a sequence of ECG measurement values, where: (i) each ECG measurement value may be recorded at a particular point-in-time of a covered time period that comprises the ongoing sleep window, and (ii) the ordering of the sequence of ECG measurement values is determined based at least in part on a temporal ordering of point-in-times associated with the ECG measurement values. The in-sleep ECG sequence 712 may be determined based at least in part on monitoring data captured using an ECG sensor device, such as an ECG sensor device that captures ECG measurement values using electrodes placed on the skin of the monitored individual. In some embodiments, the covered time period for the in-sleep ECG sequence 712 is different from the covered time period for at least one other in-sleep individual monitoring data type discussed in this Subsection.

As depicted in FIG. 7, the in-sleep ECG sequence 712 may be processed by an in-sleep ECG sequence processing machine learning framework 721 to generate a set of in-sleep ECG representations 731. In some embodiments, each in-sleep ECG representation is a representation of the ongoing sleep window that may be generated based at least in part on the ECG sequence for the ongoing sleep window. In some embodiments, generating the set of in-sleep ECG representations 731 for an ongoing sleep window based at least in part on the in-sleep ECG sequence 712 for the ongoing sleep window may be performed using an in-sleep ECG sequence processing machine learning framework 721, such as the in-sleep ECG sequence processing machine learning framework 721 that is depicted in FIG. 8 and described in greater detail below. As depicted in FIG. 6, the in-sleep ECG sequence processing machine learning framework 721 first extracts the following sequences from the in-sleep ECG sequence 712: (i) a wave feature sequence 801, (ii) a heart rate feature sequence 802, (iii) a pulse feature sequence 803, and (iv) an EEG frequency domain sequence 804.

The wave feature sequence 801 may be generated by generating a sequence of P-QRS-T segments based at least in part on the in-sleep ECG sequence 712 and then determining, for each P-QRS-T segment, features that describe respective placement of the P wave, the QRS complex, and the T wave in the P-QRS-T segment. For example, each value in the wave feature sequence 801 may describe one or more of the following features for a corresponding P-QRS-T segment that is associated with the wave feature sequence value: the PR interval of the corresponding P-QRS-T segment that describes the time from the beginning of the P wave of the corresponding P-QRS-T segment to the beginning of the QRS complex of the corresponding P-QRS-T segment, a QT interval of the corresponding P-QRS-T segment that describes the time from the beginning of the QRS complex of the corresponding P-QRS-T segment to the end of the T wave of the corresponding P-QRS-T segment, one or more features (e.g., a time period) of the QRS complex of the corresponding P-QRS-T segment, one or more features (e.g., a time period) of the sub-segment of the corresponding P-QRS-T segment that begins with the end of the QRS complex of the corresponding P-QRS-T segment and ends with the end of the T wave of the corresponding P-QRS-T segment, one or more features (e.g., a time period) of the subsegment of the corresponding P-QRS-T segment that begins with the end of the QRS complex of the corresponding P-QRS-T segment and ends with the beginning of the T wave of the corresponding P-QRS-T segment, one or more features (e.g., a time period) of an ST subsegment of the corresponding P-QRS-T segment, one or more features (e.g., a time period) of a PR subsegment of the corresponding P-QRS-T segment, and/or the like.

Once generated, the wave feature sequence 801 may be processed by a wave feature processing recurrent neural network machine learning model 811 to generate a wave-based representation 821 of the ongoing sleep window, which may be an example of an in-sleep ECG representation. The wave feature processing recurrent neural network machine learning model 811 may be configured, at each nth non-initial timestep of a set of timesteps, process an nth value (e.g., an atomic value, a vector, and/or the like) of the wave feature sequence 801 and a hidden state value of a preceding timestep to generate a hidden state, where the wave-based representation 821 may be generated based at least in part on a hidden state of a final timestep of the set of timesteps. In some embodiments, during an initial timestep, the wave feature processing recurrent neural network machine learning model 811 is configured to process a first value of the wave feature sequence 801 and a default hidden state value to generate a hidden state, where the hidden state may then be passed as an input to a second timestep of the wave feature processing recurrent neural network machine learning model 811. In some embodiments, the wave feature processing recurrent neural network machine learning model 811 comprises at least one of a conventional recurrent neural network, a long short term memory recurrent neural network, a gated recurrent unit recurrent neural network, and/or the like. In some embodiments, each hidden state of a timestep of the wave feature processing recurrent neural network machine learning model 811 is a vector.

The heart rate feature sequence 802 may be generated by generating a heart rate value for each ECG measurement value described by the in-sleep ECG sequence 712. Once generated, the heart rate feature sequence 802 may be processed by a heart rate feature processing recurrent neural network machine learning model 812 to generate a heart-rate-based representation 822 of the ongoing sleep window, which may be an example of an in-sleep ECG representation. The heart rate feature processing recurrent neural network machine learning model 812 may be configured, at each nth non-initial timestep of a set of timesteps, process an nth value (e.g., an atomic value, a vector, and/or the like) of the heart rate feature sequence 802 and a hidden state value of a preceding timestep to generate a hidden state, where the heart-rate-based representation 822 may be generated based at least in part on a hidden state of a final timestep of the set of timesteps. In some embodiments, during an initial timestep, the heart rate feature processing recurrent neural network machine learning model 812 is configured to process a first value of the heart rate feature sequence 802 and a default hidden state value to generate a hidden state, where the hidden state may then be passed as an input to a second timestep of the heart rate feature processing recurrent neural network machine learning model 812. In some embodiments, the heart rate feature processing recurrent neural network machine learning model 812 comprises at least one of a conventional recurrent neural network, a long short term memory recurrent neural network, a gated recurrent unit recurrent neural network, and/or the like. In some embodiments, each hidden state of a timestep of the heart rate feature processing recurrent neural network machine learning model 812 is a vector.

The pulse feature sequence 803 may be generated by generating a pulse rate value for each ECG measurement value described by the in-sleep ECG sequence 712. Once generated, the pulse feature sequence 803 may be processed by a pulse feature processing recurrent neural network machine learning model 813 to generate a pulse-based representation 823 of the ongoing sleep window, which may be an example of an in-sleep ECG representation. The pulse feature processing recurrent neural network machine learning model 813 may be configured, at each nth non-initial timestep of a set of timesteps, process an nth value (e.g., an atomic value, a vector, and/or the like) of the pulse feature sequence 603 and a hidden state value of a preceding timestep to generate a hidden state, where the pulse-based representation 823 may be generated based at least in part on a hidden state of a final timestep of the set of timesteps. In some embodiments, during an initial timestep, the pulse feature processing recurrent neural network machine learning model 813 is configured to process a first value of the pulse feature sequence 803 and a default hidden state value to generate a hidden state, where the hidden state may then be passed as an input to a second timestep of the pulse feature processing recurrent neural network machine learning model 813. In some embodiments, the pulse feature processing recurrent neural network machine learning model 813 comprises at least one of a conventional recurrent neural network, a long short term memory recurrent neural network, a gated recurrent unit recurrent neural network, and/or the like. In some embodiments, each hidden state of a timestep of the pulse feature processing recurrent neural network machine learning model 813 is a vector.

The EEG frequency domain sequence 804 may be generated based at least in part on the output of mapping the in-sleep ECG sequence 712 to a frequency domain using one or more Fast Fourier Transform (FFT) operations. Once generated, the EEG frequency domain sequence 804 may be processed using a convolutional neural network machine learning model 814 (e.g., a one-dimensional convolutional neural network machine learning model) to generate a convolutional EEG frequency domain sequence that may then be processed by an EEG frequency domain processing recurrent neural network machine learning model 815 to generate an EEG frequency domain representation 824, which may be an example of an in-sleep ECG representation. The EEG frequency domain processing recurrent neural network machine learning model 815 may be configured, at each nth non-initial timestep of a set of timesteps, process an nth value (e.g., an atomic value, a vector, and/or the like) of the convolutional EEG frequency domain sequence and a hidden state value of a preceding timestep to generate a hidden state, where the EEG frequency domain representation 824 may be generated based at least in part on a hidden state of a final timestep of the set of timesteps. In some embodiments, during an initial timestep, the EEG frequency domain processing recurrent neural network machine learning model 815 is configured to process a first value of the convolutional EEG frequency domain sequence and a default hidden state value to generate a hidden state, where the hidden state may then be passed as an input to a second timestep of the EEG frequency domain processing recurrent neural network machine learning model 815. In some embodiments, the EEG frequency domain processing recurrent neural network machine learning model 815 comprises at least one of a conventional recurrent neural network, a long short term memory recurrent neural network, a gated recurrent unit recurrent neural network, and/or the like. In some embodiments, each hidden state of a timestep of the EEG frequency domain processing recurrent neural network machine learning model 815 is a vector.

Returning to FIG. 7, the in-sleep EEG sequence 713 may describe a sequence of EEG measurement values, where: (i) each ECG measurement value may be recorded at a particular point-in-time of a covered time period that comprises the ongoing sleep window, and (ii) the ordering of the sequence of EEG measurement values is determined based at least in part on a temporal ordering of point-in-times associated with the EEG measurement values. The in-sleep EEG sequence 713 may be determined based at least in part on monitoring data captured using an EEG sensor device, such as an EEG sensor device that captures EEG measurement values using electrodes placed on the scalp of the monitored individual. In some embodiments, the covered time period for the in-sleep EEG sequence 713 is different from the covered time period for at least one other in-sleep individual monitoring data type discussed in this Subsection.

Once the in-sleep EEG sequence 713 is generated/obtained, an EEG frequency domain sequence 741 may be generated based at least in part on the output of mapping the in-sleep EEG sequence 713 to a frequency domain using one or more Fast Fourier Transform (FFT) operations. Once generated, the EEG frequency domain sequence 741 may be processed using a convolutional neural network machine learning model (e.g., a one-dimensional convolutional neural network machine learning model) to generate a convolutional EEG frequency domain sequence 742 that may then be processed by an EEG feature processing recurrent neural network machine learning model 722 to generate an in-sleep EEG-based representation 732. The EEG feature processing recurrent neural network machine learning model 722 may be configured, at each nth non-initial timestep of a set of timesteps, process an nth value (e.g., an atomic value, a vector, and/or the like) of the convolutional EEG frequency domain sequence 742 and a hidden state value of a preceding timestep to generate a hidden state, where the in-sleep EEG-based representation 732 may be generated based at least in part on a hidden state of a final timestep of the set of timesteps. In some embodiments, during an initial timestep, the EEG feature processing recurrent neural network machine learning model 722 is configured to process a first value of the convolutional EEG frequency domain sequence 742 and a default hidden state value to generate a hidden state, where the hidden state may then be passed as an input to a second timestep of the EEG feature processing recurrent neural network machine learning model 722. In some embodiments, the EEG feature processing recurrent neural network machine learning model 722 comprises at least one of a conventional recurrent neural network, a long short term memory recurrent neural network, a gated recurrent unit recurrent neural network, and/or the like. In some embodiments, each hidden state of a timestep of the EEG feature processing recurrent neural network machine learning model 722 is a vector.

The in-sleep movement measurement sequence 714 may describe one or more body movement measures for the monitored individual during a covered time period that comprises the ongoing sleep window. For example, the in-sleep movement measurement sequence 714 may determine a sequence of point-in-time pressure/weight sensor measurements recorded by one or more sensor devices connected to various locations on a mattress of the monitored individual. In some embodiments, the covered time period for the in-sleep movement measurement sequence 714 is different from the covered time period for at least one other in-sleep individual monitoring data type discussed in this Subsection.

Once the in-sleep movement measurement sequence 714 is generated/obtained, a movement measurement frequency domain sequence 743 may be generated based at least in part on the output of mapping the in-sleep movement measurement sequence 714 to a frequency domain using one or more Fast Fourier Transform (FFT) operations. Once generated, the movement measurement frequency domain sequence 743 may be processed using a convolutional neural network machine learning model (e.g., a one-dimensional convolutional neural network machine learning model) to generate a convolutional movement measurement frequency domain sequence 744 that may then be processed by a movement measurement feature processing recurrent neural network machine learning model 723 to generate an in-sleep movement-based representation 733. The movement measurement feature processing recurrent neural network machine learning model 723 may be configured, at each nth non-initial timestep of a set of timesteps, process an nth value (e.g., an atomic value, a vector, and/or the like) of the convolutional movement measurement frequency domain sequence 744 and a hidden state value of a preceding timestep to generate a hidden state, where the in-sleep movement-based representation 733 may be generated based at least in part on a hidden state of a final timestep of the set of timesteps. In some embodiments, during an initial timestep, the movement measurement feature processing recurrent neural network machine learning model 723 is configured to process a first value of the convolutional movement measurement frequency domain sequence 744 and a default hidden state value to generate a hidden state, where the hidden state may then be passed as an input to a second timestep of the movement measurement feature processing recurrent neural network machine learning model 723. In some embodiments, the movement measurement feature processing recurrent neural network machine learning model 723 comprises at least one of a conventional recurrent neural network, a long short term memory recurrent neural network, a gated recurrent unit recurrent neural network, and/or the like. In some embodiments, each hidden state of a timestep of the movement measurement feature processing recurrent neural network machine learning model 723 is a vector.

The in-sleep bedside audio sequence 715 may describe one or more body audio features for a monitored environment of the monitored individual during a covered time period that comprises the ongoing sleep window. For example, the in-sleep bedside audio sequence 715 may determine a sequence of point-in-time audio features measurements recorded by one or more microphone sensor devices connected to various locations of the monitored environment. In some embodiments, the covered time period for the in-sleep bedside audio sequence 715 is different from the covered time period for at least one other in-sleep individual monitoring data type discussed in this Subsection.

Once the in-sleep bedside audio sequence 715 is generated/obtained, a bedside audio frequency domain sequence 745 may be generated based at least in part on the output of mapping the in-sleep bedside audio sequence 715 to a frequency domain using one or more Fast Fourier Transform (FFT) operations. Once generated, the bedside audio frequency domain sequence 745 may be processed using a convolutional neural network machine learning model (e.g., a one-dimensional convolutional neural network machine learning model) to generate a bedside audio frequency domain sequence 746 that may then be processed by a bedside audio feature processing recurrent neural network machine learning model 724 to generate an in-sleep audio-based representation 734. The bedside audio feature processing recurrent neural network machine learning model 724 may be configured, at each nth non-initial timestep of a set of timesteps, process an nth value (e.g., an atomic value, a vector, and/or the like) of the bedside audio frequency domain sequence 746 and a hidden state value of a preceding timestep to generate a hidden state, where the in-sleep audio-based representation 734 may be generated based at least in part on a hidden state of a final timestep of the set of timesteps. In some embodiments, during an initial timestep, the bedside audio feature processing recurrent neural network machine learning model 724 is configured to process a first value of the bedside audio frequency domain sequence 746 and a default hidden state value to generate a hidden state, where the hidden state may then be passed as an input to a second timestep of the bedside audio feature processing recurrent neural network machine learning model 724. In some embodiments, the bedside audio feature processing recurrent neural network machine learning model 724 comprises at least one of a conventional recurrent neural network, a long short term memory recurrent neural network, a gated recurrent unit recurrent neural network, and/or the like. In some embodiments, each hidden state of a timestep of the bedside audio feature processing recurrent neural network machine learning model 724 is a vector.

The in-sleep facial feature sequence 716 may describe a plurality of point-in-time images and/or image-based features captured based at least in part on output data of a camera device that is configured to capture images of the face of the monitored individual during a covered time period that comprises the ongoing sleep window. In some embodiments, the covered time period for the in-sleep facial feature sequence 716 is different from the covered time period for at least one other in-sleep individual monitoring data type discussed in this Subsection.

Once the in-sleep facial feature sequence 716 is generated/obtained, the in-sleep facial feature sequence 716 may be processed using an emotion detection machine learning model to detect an in-sleep emotional sequence 747 that describes a sequence of emotional designations for the monitored individual during the covered time period. For example, the emotion detection machine learning model may process, for each time unit of the covered time, an emotional designation based at least in part on the facial image for the time unit, and then combine the emotional designations based at least in part on a temporal order of the time units to generate the in-sleep emotional sequence 747. As another example, the emotion detection machine learning model may process, for each time unit of the covered time, an emotional designation vector based at least in part on the facial image for the time unit, and then combine the emotional designation vectors based at least in part on a temporal order of the time units to generate the in-sleep emotional sequence 747.

Once the in-sleep emotional sequence 747 is generated/obtained, the in-sleep emotional sequence 747 may be processed using a facial feature processing recurrent neural network machine learning model to generate an in-sleep emotional representation 735 for the ongoing sleep window. The facial feature processing recurrent neural network machine learning model 725 may be configured, at each nth non-initial timestep of a set of timesteps, process an nth value (e.g., an atomic value, a vector, and/or the like) of the in-sleep emotional sequence 747 and a hidden state value of a preceding timestep to generate a hidden state, where the in-sleep emotional representation 735 may be generated based at least in part on a hidden state of a final timestep of the set of timesteps. In some embodiments, during an initial timestep, the facial feature processing recurrent neural network machine learning model 725 is configured to process a first value of the in-sleep emotional sequence 747 and a default hidden state value to generate a hidden state, where the hidden state may then be passed as an input to a second timestep of the facial feature processing recurrent neural network machine learning model 725. In some embodiments, the facial feature processing recurrent neural network machine learning model 725 comprises at least one of a conventional recurrent neural network, a long short term memory recurrent neural network, a gated recurrent unit recurrent neural network, and/or the like. In some embodiments, each hidden state of a timestep of the facial feature processing recurrent neural network machine learning model 725 is a vector.

The in-sleep thermal camera output sequence 717 may describe a sequence of features determined based at least in part on the output of a thermal camera over a covered time period that includes the in-sleep time period. In some embodiments, the covered time period for the in-sleep thermal camera output sequence 717 is different from the covered time period for at least one other in-sleep individual monitoring data type discussed in this Subsection.

Once generated/obtained, the in-sleep thermal camera output sequence 717 may be processed by a convolutional neural network machine learning model (e.g., a two-dimensional convolutional neural network machine learning model) to generate a convolutional thermal sequence 748. The convolutional thermal sequence 748 may then be processed by a convolutional thermal sequence processing recurrent neural network machine learning model 726 to generate a convolutional thermal sequence representation 736 of the ongoing sleep window. The convolutional thermal sequence processing recurrent neural network machine learning model 726 may be configured, at each nth non-initial timestep of a set of timesteps, process an nth value (e.g., an atomic value, a vector, and/or the like) of the convolutional thermal sequence 748 and a hidden state value of a preceding timestep to generate a hidden state, where the convolutional thermal sequence representation 736 be generated based at least in part on a hidden state of a final timestep of the set of timesteps. In some embodiments, during an initial timestep, the convolutional thermal sequence processing recurrent neural network machine learning model 726 is configured to process a first value of the convolutional thermal sequence 748 and a default hidden state value to generate a hidden state, where the hidden state may then be passed as an input to a second timestep of the convolutional thermal sequence processing recurrent neural network machine learning model 726. In some embodiments, convolutional thermal sequence processing recurrent neural network machine learning model 726 comprises at least one of a conventional recurrent neural network, a long short term memory recurrent neural network, a gated recurrent unit recurrent neural network, and/or the like. In some embodiments, each hidden state of a timestep of the convolutional thermal sequence processing recurrent neural network machine learning model 726 is a vector.

Once generated/obtained, the in-sleep thermal camera output sequence 717 may be used to generate a body temperature sequence 749 that may describe a sequence of point-in-time body temperature measurement estimates for the monitored individual based at least in part on the in-sleep thermal camera output sequence 717. The body temperature sequence 749 may then be processed by a temperature feature processing recurrent neural network machine learning model 727 to generate a temperature representation 737 of the ongoing sleep window. The temperature feature processing recurrent neural network machine learning model 727 may be configured, at each nth non-initial timestep of a set of timesteps, process an nth value (e.g., an atomic value, a vector, and/or the like) of the body temperature sequence 749 and a hidden state value of a preceding timestep to generate a hidden state, where the temperature representation 737 be generated based at least in part on a hidden state of a final timestep of the set of timesteps. In some embodiments, during an initial timestep, the temperature feature processing recurrent neural network machine learning model 727 is configured to process a first value of the body temperature sequence 749 and a default hidden state value to generate a hidden state, where the hidden state may then be passed as an input to a second timestep of the temperature feature processing recurrent neural network machine learning model 727. In some embodiments, the temperature feature processing recurrent neural network machine learning model 727 comprises at least one of a conventional recurrent neural network, a long short term memory recurrent neural network, a gated recurrent unit recurrent neural network, and/or the like. In some embodiments, each hidden state of a timestep of the temperature feature processing recurrent neural network machine learning model 727 is a vector.

Once generated/obtained, the in-sleep static data vector 711, the set of in-sleep ECG representations 731, the in-sleep EEG-based representation 732, the in-sleep movement-based representation 733, the in-sleep audio-based representation 734, the in-sleep emotional representation 735, the convolutional thermal sequence representation 736, and the temperature representation 737 are combined (e.g., concatenated, merged, averaged, summed up, and/or the like) by a feature merging machine learning model 781 to generate a model input 751 for the in-sleep parasomnia episode likelihood prediction machine learning model 761.

The inputs to the feature merging machine learning model may include n inputs, where each input may be a vector or an atomic value, while the outputs of the feature merging machine learning model may include a model input vector.

The model input 751 for the in-sleep parasomnia episode likelihood prediction machine learning model 761 may then processed by the in-sleep parasomnia episode likelihood prediction machine learning model 761 to generate the in-sleep parasomnia episode likelihood score 771 for a monitored individual for the ongoing sleep window. The in-sleep parasomnia episode likelihood prediction machine learning model 761 may comprise a dense neural network and/or a fully-connected neural network. The output of the in-sleep parasomnia episode likelihood prediction machine learning model 761 may comprise a vector, where a first value of the vector describes a likelihood that the monitored individual is experiencing a parasomnia episode during an ongoing sleep window and a second value of the vector describes a likelihood that the monitored individual is not experiencing a parasomnia episode during an ongoing sleep window. The output of the in-sleep parasomnia episode likelihood prediction machine learning model 761 may comprise an atomic value that describes a likelihood that the monitored individual is experiencing a parasomnia episode during an ongoing sleep window and/or a likelihood that the monitored individual is not experiencing a parasomnia episode during an ongoing sleep window. The output of the in-sleep parasomnia episode likelihood prediction machine learning model 761 may comprise a vector, where each value of the vector describes the likelihood that the monitored individual is experiencing a parasomnia episode having a parasomnia episode type that is associated with the value during an ongoing sleep window.

As described in this subsection and the preceding subsection, various embodiments of the present invention improve real-time efficiency of performing parasomnia-related predictive data analysis for a monitored individual by introducing techniques that enable integrating pre-sleep predictive inferences into in-sleep predictive inferences in order to generate in-sleep predictive inferences faster. For example, in some embodiments, both pre-sleep models and in-sleep models are configured to process data having common feature types, such as an ECG feature sequence, an EGG feature sequence, and/or the like. By using this technique, various embodiments of the present invention impose a conceptual relationship between the predictive inferences performed by pre-sleep models and predictive inferences performed by in-sleep models, which in turn makes pre-sleep predictive inferences more pertinent to in-sleep predictive inferences and thus enables making in-sleep models more efficient and faster by integrating pre-sleep predictive inferences into such models. This is critical for operational reliability of real-time parasomnia detection/intervention models, as due to health reasons time is of the essence when it comes to harm reduction objectives of such models. Accordingly, various embodiments of the present invention make important technical contributions to improving real-time efficiency of performing parasomnia-related predictive data analysis for a monitored individual by introducing techniques that facilitate effective integration of pre-sleep feedback into in-sleep predictive inferences of parasomnia detection/intervention models.

C. Generating Recommended Pre-Sleep Parasomnia Reduction Interventions

In some embodiments, a recommended pre-sleep parasomnia reduction intervention is selected from a set of candidate pre-sleep parasomnia reduction interventions. In some of the noted embodiments, to select the recommended pre-sleep parasomnia reduction intervention from the set of candidate pre-sleep parasomnia reduction interventions, a pre-sleep parasomnia reduction intervention machine learning model is used, where the pre-sleep parasomnia reduction intervention machine learning model may have an architecture that is similar to the architecture of a pre-sleep parasomnia episode likelihood prediction machine learning model except that, in addition to the inputs of the pre-sleep parasomnia episode likelihood prediction machine learning model, the pre-sleep parasomnia reduction intervention machine learning model takes an intervention representation (e.g., a vector representation, such as a one-hot-coded representation) of a particular candidate pre-sleep parasomnia reduction intervention as an additional input. In some of the noted embodiments, given a set of inputs that is determined based at least in part on the pre-sleep individual monitoring data for a pre-sleep window and an additional input that is associated with a particular candidate pre-sleep parasomnia reduction intervention, the output of the pre-sleep parasomnia episode likelihood prediction machine learning model is a conditional likelihood score that describes a likelihood that a sleep window following the pre-sleep window will include parasomnia episodes if the particular candidate pre-sleep parasomnia reduction intervention is performed during the pre-sleep window and/or before the sleep window.

Accordingly, in some embodiments, to select a recommended pre-sleep parasomnia reduction intervention from a set of candidate pre-sleep parasomnia reduction interventions for a particular pre-sleep window, a pre-sleep parasomnia reduction intervention machine learning model may be used to generate a conditional likelihood score for each candidate pre-sleep parasomnia reduction intervention, and then the recommended pre-sleep parasomnia reduction intervention may be selected based at least in part on each conditional likelihood score. For example, the recommended pre-sleep parasomnia reduction intervention may be selected as the candidate pre-sleep parasomnia reduction intervention having the lowest conditional likelihood score of all of the conditional likelihood scores of the set of candidate pre-sleep parasomnia reduction interventions. As another example, the recommended pre-sleep parasomnia reduction intervention may be generated based at least in part on a combination of each candidate pre-sleep parasomnia reduction intervention whose conditional likelihood score satisfies (e.g., falls below) a conditional likelihood score threshold.

In some embodiments, to select the recommended pre-sleep parasomnia reduction intervention from the set of candidate pre-sleep parasomnia reduction interventions for a pre-sleep window, a pre-sleep window representation of the pre-sleep window (e.g., a pre-sleep window representation that is determined based at least in part on a model input of a pre-sleep parasomnia episode likelihood prediction machine learning model for the pre-sleep window) is used to generate an existing state of the pre-sleep environment that may then be supplied to a deep reinforcement learning machine learning model, where the deep reinforcement machine learning model may be configured to select the recommended pre-sleep parasomnia reduction intervention in a manner that is configured to maximize a value generation sub-model (e.g., a Q function) of the deep reinforcement machine learning model given the existing state defined by the pre-sleep window representation.

For example, in some embodiments, each candidate pre-sleep parasomnia reduction intervention may be defined by an intervention vector that is characterized by a unique combination of values for a set of pre-sleep operational parameter values (e.g., a unique combination of a value for a pre-sleep operational parameter that describes the length of pre-sleep recommended meditation, a value for a pre-sleep operational parameter that describes the type of pre-sleep recommended meditation, a value for a pre-sleep operational parameter that describes the length of pre-sleep recommended reading, a value for a pre-sleep operational parameter that describes the type of pre-sleep recommended meditation, a value for a pre-sleep operational parameter that describes the intensity of pre-sleep environment lighting, and/or the like). In some of the noted embodiments, the deep reinforcement learning machine learning model is configured to identify the recommended pre-sleep parasomnia reduction intervention as the candidate pre-sleep parasomnia reduction intervention whose respective intervention vector maximizes the output of the value generation sub-model (e.g., a Q function) given a pre-sleep window representation.

In some embodiments, the value generation sub-model us characterized by the equation $Q(A_t,S_t) \leftarrow Q(A_t,S_t) + \alpha(R_{t+1} + \gamma Q(A_{t+1},S_{t+1}) - Q(A_t,S_t))$, where each $A_x$ is the action taken at time x and each $S_x$ is the existing environment state at time x. Moreover, $\alpha$ is the learning rate, $\gamma$ is the discount rate for future rewards, and $R_{t+1}$ is the reward measure at a particular future timestep t+1. R can be chosen to describe the benefit of avoiding parasomnia events at any point in time, e.g., R=0 for not triggering a parasomnia event and R=−10 when triggering an event. In some embodiments, the deep reinforcement learning machine learning model is configured to perform the following optimization:

$$\max_{A_t} Q(A_t, S_t).$$

D. Generating Recommended In-Sleep Parasomnia Reduction Interventions

In some embodiments, a recommended in-sleep parasomnia reduction intervention is selected from a set of candidate in-sleep parasomnia reduction interventions. In some of the noted embodiments, to select the recommended in-sleep parasomnia reduction intervention from the set of candidate in-sleep parasomnia reduction interventions, an in-sleep parasomnia reduction intervention machine learning model is used, where the in-sleep parasomnia reduction intervention machine learning model may have an architecture that is similar to the architecture of an in-sleep parasomnia episode likelihood prediction machine learning model except that, in addition to the inputs of the in-sleep parasomnia episode likelihood prediction machine learning model, the in-sleep parasomnia reduction intervention machine learning model takes an intervention representation (e.g., a vector representation, such as a one-hot-coded representation) of a particular candidate in-sleep parasomnia reduction intervention as an additional input. In some of the noted embodiments, given a set of inputs that is determined based at least in part on the in-sleep individual monitoring data for an ongoing sleep window and an additional input that is associated with a particular candidate in-sleep parasomnia reduction intervention, the output of the in-sleep parasomnia episode likelihood prediction machine learning model is a conditional likelihood score that describes a likelihood that the ongoing sleep window will include parasomnia episodes if the particular candidate in-sleep parasomnia reduction intervention is performed during the ongoing sleep window.

Accordingly, in some embodiments, to select a recommended in-sleep parasomnia reduction intervention from a set of candidate in-sleep parasomnia reduction interventions for a particular ongoing sleep window, an in-sleep parasomnia reduction intervention machine learning model may be used to generate a conditional likelihood score for each candidate in-sleep parasomnia reduction intervention, and then the recommended in-sleep parasomnia reduction intervention may be selected based at least in part on each conditional likelihood score. For example, the recommended in-sleep parasomnia reduction intervention may be selected as the candidate in-sleep parasomnia reduction intervention having the lowest conditional likelihood score of all of the conditional likelihood scores of the set of candidate in-sleep parasomnia reduction interventions. As another example, the recommended in-sleep parasomnia reduction intervention may be generated based at least in part on a combination of each candidate in-sleep parasomnia reduction intervention whose conditional likelihood score satisfies (e.g., falls below) a conditional likelihood score threshold.

In some embodiments, to select the recommended in-sleep parasomnia reduction intervention from the set of candidate in-sleep parasomnia reduction interventions for an ongoing sleep window, an ongoing sleep time representation of the ongoing sleep window (e.g., an ongoing sleep time representation that is determined based at least in part on a model input of an in-sleep parasomnia episode likelihood prediction machine learning model for the ongoing sleep window) is used to generate an existing state of the environment that may then be supplied to a deep reinforcement learning machine learning model, where the deep reinforcement learning machine learning model may be configured to select the recommended in-sleep parasomnia reduction intervention in a manner that is configured to maximize a value generation sub-model (e.g., a Q function) of the deep reinforcement machine learning model given the existing state defined by the ongoing sleep time representation.

For example, in some embodiments, each candidate in-sleep parasomnia reduction intervention may be defined by an intervention vector that is characterized by a unique combination of values for a set of in-sleep operational parameter values (e.g., a unique combination of a value for an in-sleep operational parameter that describes a particular ambient light projection level of the in-sleep environment during the ongoing sleep window, an in-sleep operational parameter that describes a particular vibration intensity of the in-sleep environment during the ongoing sleep window, an in-sleep operational parameter that describes a particular ambient sound projection type of the in-sleep environment during the ongoing sleep window, and an in-sleep operational parameter that describes a particular ambient sound projection intensity level of the environment during the ongoing sleep window, and/or the like). In some of the noted embodiments, the deep reinforcement learning machine learning model is configured to identify the recommended in-sleep parasomnia reduction intervention as the candidate in-sleep parasomnia reduction intervention whose respective intervention vector maximizes the output of the value generation sub-model (e.g., a Q function) given an ongoing sleep window representation.

As described above, each candidate in-sleep parasomnia reduction intervention may be associated with an intervention vector that describes a unique combination of values for a set of operational parameter values. For example, a particular candidate in-sleep parasomnia reduction intervention may be associated with an intervention vector that describes a particular ambient light projection level, a particular vibration intensity, a particular ambient sound projection type (e.g., a particular music track, voice of the monitored individual, voice of a person close to the monitored individual, and/or the like), and a particular ambient sound projection intensity level. If the particular candidate in-sleep parasomnia reduction intervention is adopted as the recommended in-sleep parasomnia reduction intervention, then an in-sleep environment of an ongoing sleep window may be modified using one or more electronic devices to set the lighting of the in-sleep environment in accordance with the particular ambient light projection level, set the vibration of a bed of the in-sleep environment in accordance with the particular vibration intensity, and broadcast audio data in the in-sleep environment in accordance with the particular ambient sound projection type and the particular ambient sound projection intensity level. An exemplary intervention vector may have the form $A_t$=[ambient_light_level, watch_vibration_intensity, ambient_sound_type, ambient_sound_intensity, . . . ].

In some embodiments, the value generation sub-model us characterized by the equation $Q(A_t,S_t) \leftarrow Q(A_t,S_t)+\alpha(R_{t+1}+\gamma Q(A_{t+1},S_{t+1})-Q(A_t, S_t))$, where each $A_x$ is the action taken at time x and each $S_x$ is the existing environment state at time x. Moreover, $\alpha$ is the learning rate, $\gamma$ is the discount rate for future rewards, and R is the reward measure. R can be chosen to describe the benefit of avoiding parasomnia events at any point in time, e.g., R=0 for not triggering a parasomnia event and R=−10 when triggering an event. In some embodiments, the deep reinforcement learning machine learning model is configured to perform the following optimization:

$$\max_{A_t} Q(A_t, S_t).$$

Accordingly, various embodiments of the present invention introduce techniques for efficient parasomnia reduction intervention in real-time by introducing techniques that enable utilizing efficient deep reinforcement learning models in detecting optimal parasomnia reduction interventions. For example, in some embodiments, to select the recommended in-sleep parasomnia reduction intervention from the set of candidate in-sleep parasomnia reduction interventions for an ongoing sleep window, an ongoing sleep time representation of the ongoing sleep window (e.g., an ongoing sleep time representation that is determined based at least in part on a model input of an in-sleep parasomnia episode likelihood prediction machine learning model for the ongoing sleep window) is used to generate an existing state of the environment that may then be supplied to a deep reinforcement learning machine learning model, where the deep reinforcement learning machine learning model may be configured to select the recommended in-sleep parasomnia reduction intervention in a manner that is configured to maximize a value generation sub-model (e.g., a Q function) of the deep reinforcement machine learning model given the existing state defined by the ongoing sleep time representation. By using the noted techniques, various embodiments of the present invention enable efficient and reliable detection of optimal parasomnia reduction interventions in real-time, thus making important technical contributions to improving real-time efficiency of performing parasomnia-related predictive data analysis for a monitored individual.

E. Generating Recommended Post-Sleep Parasomnia Reduction Interventions

In some embodiments, a recommended post-sleep parasomnia reduction intervention is selected from a set of candidate post-sleep parasomnia reduction interventions. In some of the noted embodiments, to select the recommended post-sleep parasomnia reduction intervention from the set of candidate pre-sleep parasomnia reduction interventions for a post-sleep window, a post-sleep window representation may be generated for the post-sleep window based at least in part on the ongoing sleep window representation for an ongoing sleep window that precedes the post-sleep window and/or the pre-sleep window representation for a pre-sleep window that precedes the ongoing sleep window. The post-sleep window representation may then be used to generate an existing state of the post-sleep environment that may then be supplied to a deep reinforcement learning machine learning model, where the deep reinforcement learning machine learning model may be configured to select the recommended post-sleep parasomnia reduction intervention in a manner that is configured to maximize a value generation sub-model (e.g., a Q function) of the deep reinforcement machine learning model given the existing state defined by the pre-sleep window representation.

For example, in some embodiments, each candidate post-sleep parasomnia reduction intervention may be defined by an intervention vector that is characterized by a unique combination of values for a set of post-sleep operational parameter values (e.g., a unique combination of a value for a post-sleep operational parameter that describes the length of post-sleep recommended meditation, a value for a post-sleep operational parameter that describes the type of post-sleep recommended meditation, a value for a post-sleep operational parameter that describes the length of post-sleep recommended reading, a value for a pre-sleep operational parameter that describes the type of post-sleep recommended meditation, a value for a post-sleep operational parameter that describes the intensity of post-sleep environment lighting, and/or the like). In some of the noted embodiments, the deep reinforcement learning machine learning model is configured to identify the recommended post-sleep parasomnia reduction intervention as the candidate post-sleep parasomnia reduction intervention whose respective intervention vector maximizes the output of the value generation sub-model (e.g., a Q function) given a post-sleep window representation.

In some embodiments, the value generation sub-model us characterized by the equation $Q(A_t,S_t) \leftarrow Q(A_t,S_t)+\alpha(R_{t+1}+\gamma Q(A_{t+1},S_{t+1})-Q(A_t,S_t))$, where each $A_x$ is the action taken at time x and each $S_x$ is the existing environment state at time x. Moreover, $\alpha$ is the learning rate, $\gamma$ is the discount rate for future rewards, and R is the reward measure. R can be chosen to describe the benefit of avoiding parasomnia events at any point in time, e.g., R=0 for not triggering a parasomnia event and R=−10 when triggering an event. In some embodiments, the deep reinforcement learning machine learning model is configured to perform the following optimization:

$$\max_{A_t} Q(A_t, S_t).$$

F. Dynamic Deployment of Machine Learning Models

In some embodiments, the model input of a parasomnia episode likelihood prediction machine learning model (e.g., an in-sleep parasomnia episode likelihood prediction machine learning model) may be associated with statically-deployed features and dynamically-deployed features. The statically-deployed feature values may describe those feature values that can be interpreted without regard to the physical environment in which the parasomnia episode likelihood prediction machine learning model is used, while the dynamically-deployed feature values may describe those feature values whose interpretation is dependent on the physical environment in which the parasomnia episode likelihood prediction machine learning model is used. For example, the ECG sequence may correspond to a statically-deployed feature, because the EEG sequence of a monitored individual can be interpreted independently and without regard to the physical environment of the monitored individual. As another example, the beside audio sequence may correspond to a dynamically-deployed feature, as the significance of captured audio signals is a function of various physical environment features, such as the distance of the audio recording device to a monitored individual.

Accordingly, in some embodiments, because the model input of a parasomnia episode likelihood prediction machine learning model is associated with statically-deployed features and dynamically-deployed features, a trained parasomnia episode likelihood prediction machine learning model that is trained in one physical environment cannot reliably be deployed in a second physical environment, as the predictive model developed through the training process with respect to the dynamically-deployed feature values may be physical-environment-specific. Accordingly, in some embodiments, a parasomnia episode likelihood prediction machine learning model is dynamically deployed in a new physical environment in the following manner: before sufficient training data entries for the new physical environment is obtained, parasomnia episode likelihood scores for particular time windows (e.g., particular pre-sleep windows, particular ongoing sleep windows, and/or the like) are generated using a preexisting parasomnia episode likelihood prediction machine learning model whose model input is not characterized by the dynamically-deployed features, but user feedback for the particular time windows is used to aggregate training data entries that are then used to train and deploy the parasomnia episode likelihood prediction machine learning model when sufficient training data entries are obtained/recorded for training the parasomnia episode likelihood prediction machine learning model.

FIG. 9 is a flowchart diagram of an example process 900 for generating a parasomnia episode likelihood score for an ongoing sleep window that is associated with one or more statically-deployed feature values and one or more dynamically-deployed feature values. While various embodiments of the present invention describe dynamic deployment of an in-sleep parasomnia episode likelihood prediction machine learning model, a person of ordinary skill in the relevant technology will recognize that the techniques described herein can be used to dynamically deploy a pre-sleep parasomnia episode likelihood prediction machine learning model, a pre-sleep intervention recommendation machine learning model, an in-sleep intervention recommendation machine learning model, a post-sleep intervention recommendation machine learning model, and/or the like.

The process 900 begins at step/operation 901 when the predictive data analysis computing entity 106 determines whether a deployment indicator for a dynamically-deployed parasomnia episode likelihood prediction machine learning model is an affirmative deployment indicator describing that the parasomnia episode likelihood prediction machine learning model is deployed, or a negative deployment indicator describing that the parasomnia episode likelihood prediction machine learning model is not deployed. In some embodiments, the deployment indicator is determined based at least in part on whether the dynamically-deployed parasomnia episode likelihood prediction machine learning model is deployed, the dynamically-deployed parasomnia episode likelihood prediction machine learning model is deployed when one or more dynamic deployment conditions are satisfied, the one or more dynamic deployment conditions comprise a first condition requiring that a training data entry count of a training data entry set satisfies a training data entry count threshold, the parasomnia episode likelihood prediction machine learning model may be generated based at least in part on the training data entry set, and each training data entry in the training data entry set is associated with a training model input and a target model output.

In some embodiments, the dynamically-deployed parasomnia episode likelihood prediction machine learning model is only deployed when a set of dynamic deployment conditions are satisfied, where the set of dynamic deployment conditions may comprise a first condition requiring that a training data entry count of a training data entry set that is used to generate the dynamically-deployed parasomnia episode likelihood prediction machine learning model satisfies (e.g., exceeds) a threshold. In some embodiments, the set of dynamic deployment conditions comprise other conditions, such as a second condition requiring that a deviation measure for the dynamically-deployed parasomnia episode likelihood prediction machine learning model and a centralized parasomnia episode likelihood prediction machine learning model satisfies a deviation measure threshold. In some embodiments, the centralized parasomnia episode likelihood prediction machine learning model is a parasomnia episode likelihood prediction machine learning model that is determined based at least in part on aggregating trained parameter data for one or more decentralized parasomnia episode likelihood prediction machine learning models and by using one or more federated learning techniques.

In some embodiments, the one or more statically-deployed feature values of the model input of a dynamically-deployed parasomnia episode likelihood prediction machine learning model comprise an electrocardiogram representation of the ongoing sleep window, an electroencephalography representation of the ongoing sleep window, and a movement-based representation of the ongoing sleep window. In some embodiments, the one or more dynamically-deployed feature values of the model input of a dynamically-deployed parasomnia episode likelihood prediction machine learning model comprise an audio-based representation of the ongoing sleep window, a thermal camera representation of the ongoing sleep window, and an emotion-based representation of the ongoing sleep window.

In response to determining that the deployment indicator is a negative deployment indicator describing that the parasomnia episode likelihood prediction machine learning model is not deployed, the predictive data analysis computing entity 106 performs step/operations 911-913. At step/operation 911, the predictive data analysis computing entity 106 determines the parasomnia episode likelihood score based at least in part on the one or more statically-deployed feature values and using a preexisting parasomnia episode likelihood prediction machine learning model. At step/operation 912, the predictive data analysis computing entity 106 generates a new training entry in the training entry set, where the training model input of the new training entry is determined based at least in part on the one or more statically-deployed feature values and the one or more dynamically-deployed feature values, and where the target model output for the new training entry is determined based at least in part on an end user feedback data object that describes an end-user feedback (e.g., a feedback provided by a monitored individual and/or by another individual that is aware of whether the monitored individual is experiencing parasomnia episodes during the ongoing sleep window) regarding whether the ongoing sleep window includes parasomnia episodes. At step/operation 913, subsequent to generating the new training data entry of the training entry, the predictive data analysis computing entity 106 increments the training data entry count of the training entry set to indicate that a new training entry has been added to the training entry set.

In response to determining that the deployment indicator is an affirmative deployment indicator describing that the parasomnia episode likelihood prediction machine learning model is deployed, the predictive data analysis computing entity 106 performs steps/operations 921-922. At step/operation 921, the predictive data analysis computing entity 106 determines the parasomnia episode likelihood score based at least in part on the one or more statically-deployed feature values and the one or more dynamically-deployed feature values and using the dynamically-deployed parasomnia episode likelihood prediction machine learning model. At step/operation 922, the predictive data analysis computing entity 106 optionally updates the parasomnia episode likelihood score based at least in part on feedback provided by the preexisting parasomnia episode likelihood prediction machine learning model.

For example, in some embodiments, in response to determining that the deployment indicator is an affirmative deployment indicator, the predictive data analysis computing entity 106 performs the following operations: determining, based at least in part on the one or more statically-deployed feature values and using a preexisting parasomnia episode likelihood prediction machine learning model, a preexisting parasomnia episode likelihood score; determining, based at least in part on the one or more statically-deployed feature values and the one or more dynamically-deployed feature values, and using the dynamically-deployed parasomnia episode likelihood prediction machine learning model, a dynamically deployed parasomnia episode likelihood score; and determining the parasomnia episode likelihood score based at least in part on the preexisting parasomnia episode likelihood score and the dynamically deployed parasomnia episode likelihood score. In some of the noted embodiments, determining the parasomnia episode likelihood score in response to determining that the deployment indicator is the affirmative deployment indicator comprises: determining, based at least in part on the preexisting parasomnia episode likelihood score and the dynamically deployed parasomnia episode likelihood score, and using an ensemble machine learning model, the parasomnia episode likelihood score, wherein the ensemble machine learning model is characterized by a trained model weight for each of the preexisting parasomnia episode likelihood prediction machine learning model and the dynamically-deployable parasomnia episode likelihood prediction machine learning model.

Accordingly, as described herein, various embodiments of the present invention enable techniques for improving real-time efficiency of performing parasomnia-related predictive data analysis for a monitored individual by introducing techniques that enable dynamic deployment of a parasomnia episode likelihood prediction machine learning model whose expected input is associated with both statically-deployed features and dynamically-deployed features. In some embodiments, because the model input of a parasomnia episode likelihood prediction machine learning model is associated with statically-deployed features and dynamically-deployed features, a trained parasomnia episode likelihood prediction machine learning model that is trained in one physical environment cannot reliably be deployed in a second physical environment, as the predictive model developed through the training process with respect to the dynamically-deployed feature values may be physical-environment-specific. Accordingly, in some embodiments, a parasomnia episode likelihood prediction machine learning model is dynamically deployed in a new physical environment in the following manner: before sufficient training data entries for the new physical environment is obtained, parasomnia episode likelihood scores for particular time windows (e.g., particular pre-sleep windows, particular ongoing sleep windows, and/or the like) are generated using a preexisting parasomnia episode likelihood prediction machine learning model whose model input is not characterized by the dynamically-deployed features, but user feedback for the particular time windows is used to aggregate training data entries that are then used to train and deploy the parasomnia episode likelihood prediction machine learning model when sufficient training data entries are obtained/recorded for training the parasomnia episode likelihood prediction machine learning model. By using the noted techniques, various embodiments of the present invention ensure that a parasomnia episode likelihood prediction machine learning model whose expected input is associated with both statically-deployed features and dynamically-deployed features is only deployed when sufficiently trained, thus avoiding the accuracy and efficiency drawbacks of deploying insufficiently trained parasomnia episode likelihood prediction machine learning models and in doing so improving real-time efficiency of performing parasomnia-related predictive data analysis for a monitored individual.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining a recommended parasomnia reduction intervention for an ongoing sleep window, the computer-implemented method comprising:

determining, using one or more processors and a deep reinforcement machine learning model, and based at least in part on an ongoing sleep window representation of the ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention;

determining, using the one or more processors, the recommended parasomnia reduction intervention based at least in part on the plurality of operational parameter values of the recommended intervention vector; and performing, using the one or more processors, one or more prediction-based actions based at least in part on the recommended parasomnia reduction intervention.

2. The computer-implemented method of claim 1, wherein the plurality of operational parameter values of the intervention vector for a particular parasomnia reduction intervention comprise a particular ambient light projection level, a particular vibration intensity, a particular ambient sound projection type, a particular ambient sound projection intensity level, a particular room temperature setpoint as set via an air conditioning system or other space heater system, and a particular room temperature level.

3. The computer-implemented method of claim 1, wherein:
the recommended parasomnia reduction intervention is selected from a plurality of potential parasomnia reduction interventions, and
each potential parasomnia reduction intervention is associated with a unique combination of values for a plurality of operational parameters that are associated with the plurality of operational parameter values.

4. The computer-implemented method of claim 1, wherein determining the ongoing sleep window representation further comprises:
determining, based at least in part on a movement measurement sequence frequency domain representation of a movement measurement sequence for the ongoing sleep window, a convolutional movement measurement sequence for the ongoing sleep window;
determining, using a movement measurement feature processing recurrent neural network machine learning model, and based at least in part on the convolutional movement measurement sequence, a movement-based representation of the ongoing sleep window; and
determining the ongoing sleep window representation based at least in part on the movement-based representation.

5. The computer-implemented method of claim 1, wherein determining the ongoing sleep window representation further comprises:
determining, based at least in part on an electroencephalography sequence frequency domain representation of an electroencephalography sequence for the ongoing sleep window, a convolutional electroencephalography sequence for the ongoing sleep window;
determining, using an electroencephalography feature processing recurrent neural network machine learning model, and based at least in part on the convolutional electroencephalography sequence, an electroencephalography-based representation of the ongoing sleep window; and
determining the ongoing sleep window representation based at least in part on the electroencephalography-based representation.

6. The computer-implemented method of claim 1, wherein determining the ongoing sleep window representation further comprises:
determining, based at least in part on a bedside audio sequence frequency domain representation of a bedside audio sequence for the ongoing sleep window, a convolutional bedside audio sequence for the ongoing sleep window;
determining, using a bedside audio feature processing recurrent neural network machine learning model, and based at least in part on the convolutional bedside audio sequence, an audio-based representation of the ongoing sleep window; and
determining the ongoing sleep window representation based at least in part on the audio-based representation.

7. The computer-implemented method of claim 1, wherein determining the ongoing sleep window representation further comprises:
determining, using an emotional feature processing recurrent neural network machine learning model, and based at least in part on an emotional feature sequence, an emotional representation of the ongoing sleep window; and
determining the ongoing sleep window representation based at least in part on the emotional representation.

8. The computer-implemented method of claim 1, wherein determining the ongoing sleep window representation further comprises:
determining, using a convolutional thermal sequence processing recurrent neural network machine learning model, and based at least in part on a convolutional thermal sequence of thermal camera output data for the ongoing sleep window, a convolutional thermal sequence representation of the ongoing sleep window;
determining, using a temperature feature processing machine learning model, and based at least in part on a temperature feature sequence of the ongoing sleep window, a temperature representation of the ongoing sleep window; and
determining the ongoing sleep window representation based at least in part on the convolutional thermal sequence representation and the temperature representation.

9. The computer-implemented method of claim 1, wherein determining the ongoing sleep window representation comprises:
determining, based at least in part on an electrocardiogram sequence of the ongoing sleep window, a wave feature sequence, a heart rate feature sequence, and a pulse feature sequence;
determining, using a wave feature processing recurrent neural network machine learning model, and based at least in part on the wave feature sequence, a wave-based representation of the electrocardiogram sequence;
determining, using a heart rate feature processing recurrent neural network machine learning model, and based at least in part on the heart rate feature sequence, a heart-rate-based representation of the electrocardiogram sequence;
determining, using a pulse feature processing recurrent neural network machine learning model, and based at least in part on the pulse feature sequence, a pulse-based representation of the electrocardiogram sequence;
determining the ongoing sleep window representation based at least in part on the wave-based engineered feature, the heart-rate-based feature, the pulse-based feature, and an electrocardiogram sequence frequency domain representation of the electrocardiogram sequence.

10. An apparatus for determining a recommended parasomnia reduction intervention for an ongoing sleep window, the at least one memory and the program code configured to, with the at least one processor, cause the apparatus to at least:
  determine, using a deep reinforcement machine learning model, and based at least in part on an ongoing sleep window representation of the ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention;
  determine the recommended parasomnia reduction intervention based at least in part on the plurality of operational parameter values of the recommended intervention vector; and
  perform one or more prediction-based actions based at least in part on the recommended parasomnia reduction intervention.

11. The apparatus of claim 10, wherein the plurality of operational parameter values of the intervention vector for a particular parasomnia reduction intervention comprise a particular ambient light projection level, a particular vibration intensity, a particular ambient sound projection type, a particular ambient sound projection intensity level, a particular room temperature setpoint as set via an air conditioning system or other space heater system, and a particular room temperature level.

12. The apparatus of claim 10, wherein:
  the recommended parasomnia reduction intervention is selected from a plurality of potential parasomnia reduction interventions, and
  each potential parasomnia reduction intervention is associated with a unique combination of values for a plurality of operational parameters that are associated with the plurality of operational parameter values.

13. The apparatus of claim 10, wherein determining the ongoing sleep window representation further comprises:
  determining, based at least in part on a movement measurement sequence frequency domain representation of a movement measurement sequence for the ongoing sleep window, a convolutional movement measurement sequence for the ongoing sleep window;
  determining, using a movement measurement feature processing recurrent neural network machine learning model, and based at least in part on the convolutional movement measurement sequence, a movement-based representation of the ongoing sleep window; and
  determining the ongoing sleep window representation based at least in part on the movement-based representation.

14. The apparatus of claim 10, wherein determining the ongoing sleep window representation further comprises:
  determining, based at least in part on an electroencephalography sequence frequency domain representation of an electroencephalography sequence for the ongoing sleep window, a convolutional electroencephalography sequence for the ongoing sleep window;
  determining, using an electroencephalography feature processing recurrent neural network machine learning model, and based at least in part on the convolutional electroencephalography sequence, an electroencephalography-based representation of the ongoing sleep window; and
  determining the ongoing sleep window representation based at least in part on the electroencephalography-based representation.

15. The apparatus of claim 10, wherein determining the ongoing sleep window representation further comprises:
  determining, based at least in part on a bedside audio sequence frequency domain representation of a bedside audio sequence for the ongoing sleep window, a convolutional bedside audio sequence for the ongoing sleep window;
  determining, using a bedside audio feature processing recurrent neural network machine learning model, and based at least in part on the convolutional bedside audio sequence, an audio-based representation of the ongoing sleep window; and
  determining the ongoing sleep window representation based at least in part on the audio-based representation.

16. The apparatus of claim 10, wherein determining the ongoing sleep window representation further comprises:
  determining, using an emotional feature processing recurrent neural network machine learning model, and based at least in part on an emotional feature sequence, an emotional representation of the ongoing sleep window; and
  determining the ongoing sleep window representation based at least in part on the emotional representation.

17. The apparatus of claim 10, wherein determining the ongoing sleep window representation further comprises:
  determining, using a convolutional thermal sequence processing recurrent neural network machine learning model, and based at least in part on a convolutional thermal sequence of thermal camera output data for the ongoing sleep window, a convolutional thermal sequence representation of the ongoing sleep window;
  determining, using a temperature feature processing machine learning model, and based at least in part on a temperature feature sequence of the ongoing sleep window, a temperature representation of the ongoing sleep window; and
  determining the ongoing sleep window representation based at least in part on the convolutional thermal sequence representation and the temperature representation.

18. The apparatus of claim 10, wherein determining the ongoing sleep window representation comprises:
  determining, based at least in part on an electrocardiogram sequence of the ongoing sleep window, a wave feature sequence, a heart rate feature sequence, and a pulse feature sequence;
  determining, using a wave feature processing recurrent neural network machine learning model, and based at least in part on the wave feature sequence, a wave-based representation of the electrocardiogram sequence;
  determining, using a heart rate feature processing recurrent neural network machine learning model, and based at least in part on the heart rate feature sequence, a heart-rate-based representation of the electrocardiogram sequence;
  determining, using a pulse feature processing recurrent neural network machine learning model, and based at least in part on the pulse feature sequence, a pulse-based representation of the electrocardiogram sequence;

determining the ongoing sleep window representation based at least in part on the wave-based engineered feature, the heart-rate-based feature, the pulse-based feature, and an electrocardiogram sequence frequency domain representation of the electrocardiogram sequence.

19. A computer program product for determining a recommended parasomnia reduction intervention for an ongoing sleep window, the computer program product comprising at least one non-transitory computer readable storage medium having computer-readable program code portions stored therein, the computer-readable program code portions configured to:

determine, using a deep reinforcement machine learning model, and based at least in part on an ongoing sleep window representation of the ongoing sleep window, a recommended intervention vector that maximizes a value generation sub-model of the deep reinforcement machine learning model given an existing state defined by the ongoing sleep window representation, wherein each intervention vector that is supplied provided to the value generation sub-model comprises a plurality of operational parameter values for a defined parasomnia reduction intervention that is associated with the parasomnia reduction intervention;

determine the recommended parasomnia reduction intervention based at least in part on the plurality of operational parameter values of the recommended intervention vector; and perform one or more prediction-based actions based at least in part on the recommended parasomnia reduction intervention.

20. The computer program product of claim 19, wherein the plurality of operational parameter values of the intervention vector for a particular parasomnia reduction intervention comprise a particular ambient light projection level, a particular vibration intensity, a particular ambient sound projection type, a particular ambient sound projection intensity level, a particular room temperature setpoint as set via an air conditioning system or other space heater system, and a particular room temperature level.

* * * * *